United States Patent
Bouton et al.

(10) Patent No.: US 8,817,889 B2
(45) Date of Patent: *Aug. 26, 2014

(54) METHOD, APPARATUS AND SYSTEM FOR USE IN MULTIMEDIA SIGNAL ENCODING

(75) Inventors: Peter M. Bouton, Kentfield, CA (US); Bruce W. Randall, Painswick (GB); Matthew Palmer, Fairfax, CA (US)

(73) Assignee: Sonic Solutions LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,485

(22) Filed: Apr. 16, 2012

(65) Prior Publication Data

US 2012/0275512 A1 Nov. 1, 2012

Related U.S. Application Data

(63) Continuation of application No. 11/428,187, filed on Jun. 30, 2006, now Pat. No. 8,175,167.

(60) Provisional application No. 60/696,349, filed on Jul. 1, 2005.

(51) Int. Cl.
*H04B 1/66* (2006.01)
*H04N 7/12* (2006.01)

(52) U.S. Cl.
USPC .............................. 375/240.26; 375/240.02

(58) Field of Classification Search
USPC ........... 348/19, 607, 391, 395, 396, 394, 404, 348/405, 409, 12, 13, 390, 699, 97; 382/232, 235, 239, 236, 275; 375/240.01–240.26

See application file for complete search history.

(56) References Cited

U.S. PATENT DOCUMENTS

| 5,872,598 | A | 2/1999 | Legall |
| 5,875,304 | A | 2/1999 | Winter et al. |
| 6,522,693 | B1 | 2/2003 | Lu et al. |
| 7,974,345 | B2 * | 7/2011 | Kondo et al. ............ 375/240.16 |
| 8,175,167 | B2 * | 5/2012 | Bouton et al. ........... 375/240.26 |
| 2001/0031009 | A1 | 10/2001 | Knee et al. |
| 2002/0044603 | A1 | 4/2002 | Rajagopalan et al. |
| 2002/0061184 | A1 | 5/2002 | Miyamoto |
| 2006/0013298 | A1 | 1/2006 | Tong et al. |
| 2006/0233237 | A1 | 10/2006 | Lu et al. |

OTHER PUBLICATIONS

Notice of Rejection from the Japanese Patent Office for App. No. 2008520319 dated Aug. 19, 2011.

(Continued)

*Primary Examiner* — Behrooz Senfi
(74) *Attorney, Agent, or Firm* — Inventive Patent Law P.C.; Jim H. Salter

(57) ABSTRACT

The present embodiments provide methods, apparatuses, systems for use in encoding and/or formatting content, such as multimedia content. Some embodiments provide methods for use in encoding content. These methods receive source content, encode the source content producing encoded content, evaluate a first encoded segment of the encoded content relative to a plurality of buffer models, determine whether the first segment of encoded content is to be re-encoded relative to one or more of the plurality of buffer models based on the evaluation; and re-encode the first segment when it is determined that the first segment is to be re encoded.

19 Claims, 21 Drawing Sheets

(56) References Cited

OTHER PUBLICATIONS

Ribas-Corbera, et al., "A Generalized Hypothetical Reference Decoder for H.264/AVC", IEEE Transactions on Circuits and Systems for Video Technology:, vol. 13, No. 7 pp. 674-684 Jul. 2003.
European Search Report from the European Patent Office for European Application No. 067861351 dated Mar. 9, 2011.
Chou, P. et al., "A Generalized Hypothetical Reference Decoder for H.264/AVC", IEEE Transactions on Circuits and Systems for Video Technology, vol. 13, No. 7 Jul. 1, 2003, p. 674-687.
Overmeire, L. et al., "Constant quality video coding using video content analysis", Signal Processing: Image Communication, vol. 20, No. 4 Apr. 1, 2005, p. 343-369.
Patent Cooperation Treaty International Preliminary Report on Patentability issued in PCT/US2006/025844 dated Jan. 9, 2008.
Patent Cooperation Treaty International Search Report issued in PCT/US2006/025844 dated Apr. 16, 2007.
Patent Cooperation Treaty Written Opinion of the International Searching Authority issued in PCT/US2006/025844 dated Apr. 16, 2007.
Neo; "Apple Files for 'Selective Re-Encoding for GOP Conformity' Patent"; vvww.macnn.com/blogsf?p=129; Oct. 19, 2006.
First Office Action from the Patent Office of the Intellectual Property Office of the People's Republic of China for Chinese Patent Application No. 2006800321631 dispatched Aug. 7, 2009.

\* cited by examiner

METHOD, APPARATUS AND SYSTEM FOR USE IN MULTIMEDIA SIGNAL ENCODING

PRIORITY CLAIM

This application is a continuation of U.S. application Ser. No. 11/428,187, filed Jun. 30, 2006 now U.S. Pat. No. 8,175,167, and entitled METHOD, APPARATUS AND SYSTEM FOR USE IN MULTIMEDIA SIGNAL ENCODING, which claims the benefit of U.S. Provisional Application No. 60/696,349, filed Jul. 1, 2005, and entitled METHOD, APPARATUS AND SYSTEM FOR USE IN MULTIMEDIA SIGNAL ENCODING, both of which are incorporated herein by reference in their entirety.

FIELD OF THE INVENTION

The present embodiments relates generally to formatting of digital data, and more specifically to encoding of digital data.

BACKGROUND

With the increase in the amount of digital content being generated, recorded and/or transmitted, the need to improve the compression and transmission of the content has also increased. Many compression, encoding and/or standards have been developed and defined to provide for the compression and transmission of content.

Many of these techniques and/or standards reduce the amount of data that has to be stored or transmitted. Further, many of these techniques allow for the reduction of data with minimal reduction in quality of the content.

SUMMARY OF THE EMBODIMENTS

The present embodiments provide methods, apparatuses, systems for use in encoding and/or formatting content, such as multimedia content. Some embodiments provide methods for use in encoding content. These methods receive source content, encode the source content producing encoded content, evaluate a first encoded segment of the encoded content relative to a plurality of buffer models, determine whether the first segment of encoded content is to be re-encoded relative to one or more of the plurality of buffer models based on the evaluation; and re-encode the first segment when it is determined that the first segment is to be re-encoded.

Some embodiments provide methods for use in encoding. These methods initiate an encoding of a source content producing encoded content; identify a segment of the encoded content to be re-encoded; identify a first candidate start point for a re-encoding of the segment; determine whether the first candidate start point is a valid start point by evaluating a first portion of the encoded content relative to the first candidate start point; and set the first candidate start point as a valid re-encode start point when the first candidate start point is validated.

Some embodiments further provide method for use in encoding by initiating an encoding of a source content producing encoded content; identifying a segment of the encoded content to be re-encoded; identifying a first candidate end point for the re-encoding of the segment; determining whether the first candidate end point is a valid end point by evaluating a fourth portion of the encoded content relative to the first candidate end point; and setting the first candidate end point as a valid re-encode end point when the first candidate end point is validated.

Method for use in encoding content are provided in some embodiments that receive source content; encode the source content producing encoded content; identify a total bit count for the encoded content; determine whether the total bit count has a predefined relationship with a threshold bit count; and re-encoding one or more segments of the encoded content producing one or more re-encoded segments such that an adjusted total bit count with the re-encoded segments has the predefined relationship with the threshold bit count when the total bit count does not have the predefined relationship with the threshold bit count.

Still further, some embodiments provide method for use in encoding multimedia content that identify one or more first segments of encoded content having a quality level having a predefined relationship with a first threshold limit; determine whether one or more additional segments having quality levels that have a predefined relationship with a second threshold level and are within predefined ranges from one or more of the first segments; re-encoding one or more of the additional segments producing one or more re-encoded additional segments having quality levels such that the re-encoded additional segments utilize fewer bits than the one or more additional segments; and re-encoding one or more of the first segments producing one or more re-encoded first segments such that the one or more re-encoded first segments have quality levels that are greater than the quality levels of the corresponding first segment.

Some embodiments provide methods for use in formatting content by parsing an encoded multimedia content stream identifying parameters of the content stream; altering one of the identified parameters; simulating at least a partial decoding of the encoded content stream based on the altered parameter; identifying whether a buffer threshold is exceed; and modifying the encoded content stream according to the altered parameter when the buffer threshold is not exceeded.

Additionally, some embodiments provide method for use facilitating an encoding of digital content. These embodiments generate a bit rate track graphically representing bit rates for portions of encoded content; generate a quality track graphically representing a quality of encoding of the portions of encoded content that corresponds with the bit rate track; and identify in the bit rate track a selection of a portion of the encoded content to be re encoded.

BRIEF DESCRIPTION OF THE DRAWINGS

The above needs are at least partially met through provisions of methods, apparatuses, and/or systems for use in encoding digital content as described in the following detailed description, particularly when studied in conjunction with the drawings, wherein.

Figure 1:
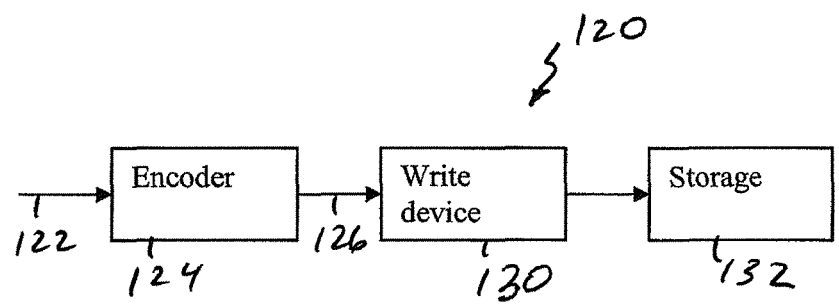
FIG. 1 depicts a simplified block diagram of an encoding system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in encoding content to achieve one or more decoder buffer models and/or encoding schemes. Further, some embodiments allow for the accurate encoding of content such that the encoded content complies with multiple decoder models according to a desired encoding scheme. Some embodiments accelerate encoding and in some implementations additionally provide for the temporally splitting of the content stream to allow for encoding of content at accelerated rates while maintaining the quality of the encoded content 126. Still further, some embodiments identify portions or segments of the encoded content to be revised and/or re-encoded, for example, to comply with one or more non-satisfied decoder models without requiring a full re-encode of the entire content stream.

FIG. 1 depicts a simplified block diagram of an encoding system 120 according to some embodiments. The system includes source content 122, an encoder 124, encoder output 126, a content writing system 130, and storage medium 132. The source content 122, such as video, audio and/or other content is supplied to the encoder 124. The encoder encodes the source content, in part, compressing the content, for example, to allow the writing system 130 to reduce the amount of memory space of the storage medium 132 needed to store the content. The encoding system can be implemented through hardware, software, firmware and/or a combination thereof, and can be operated in some instances from a single-processor or multiprocessor computer systems, minicomputers, mainframe computers, processor, microprocessor, as well as personal computers, hand-held computing devices, microprocessor-based or programmable consumer electronics. Further, in some embodiments, the encoder system 120 can be distributed over a distributed network with components of the system at different physical locations cooperating to achieve the desired encoded output.

As introduced above, the system 120 can be implemented through hardware, software, computer-executable instructions, firmware and/or combinations thereof, that can be implemented in combination with other programs and/or hardware, software and/or combinations. The encoding and/or re-encoding may also be practiced in distributed computing environments where certain tasks are performed by remote processing devices that are linked through a communications network. In a distributed computing environment, software, executables, scripts and the like can be located in both local and remote memory storage devices. A computer and/or computer network typically includes computer-readable media, such as volatile and nonvolatile media, removable and non-removable media, which can include RAM, ROM, EEPROM, flash memory or other memory technology, CD-ROM, DVD, HD-DVD, BD or other optical disk storage, magnetic cassettes, magnetic tape, magnetic disk storage or other magnetic storage devices, and/or substantially any other medium that can be used to store desired information and from which information can be retrieve. Communication over the computer and/or the network can be through a wired network or direct-wired connection, and wireless media such as acoustic, RF, infrared and other wireless communication connections, and/or other relevant communications or combinations of communication links and/or protocols.

Figure 2:
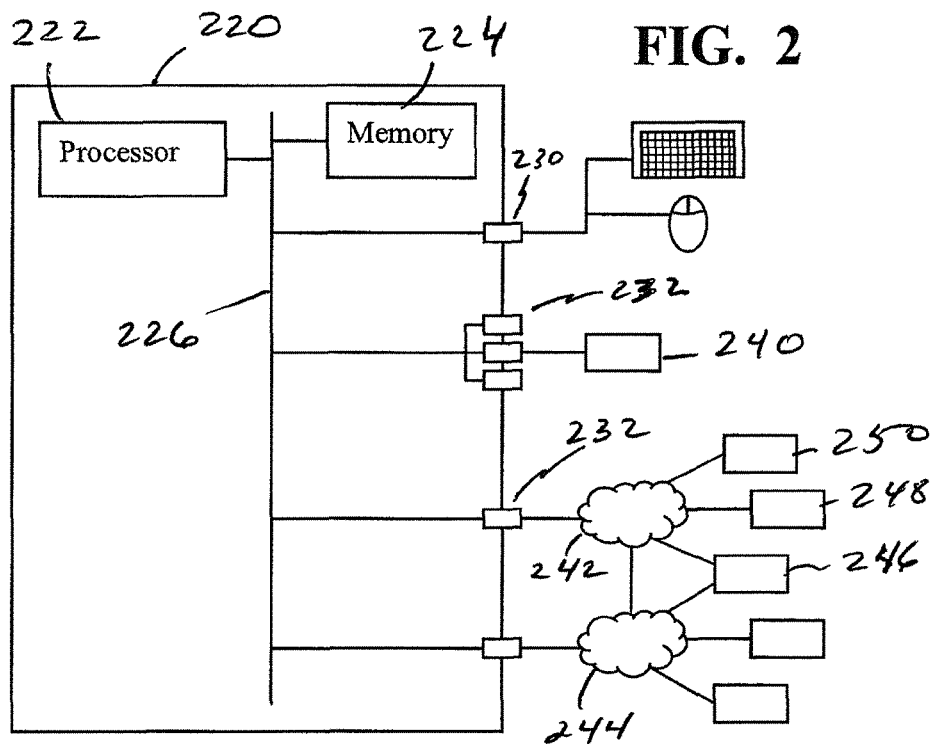
FIG. 2 depicts a simplified block diagram of a computer system that can be utilized in some embodiments to implement the encoding system of FIG. 1 and/or to execute some or all encoding and/or re-encoding.

FIG. 2 depicts a simplified block diagram of a computer system 220 that can be utilized in some embodiments to implement some or all of the encoding system 120 of FIG. 1 and/or to execute some or all encoding and re-encoding as described above and/or further below. The computer 220 can include a processing unit 222, memory 224 and communication link(s) or network 226. The processing unit 222 can be substantially any processor, microprocessor and/or plurality of processors. The communication network 226 directly and/or indirectly couples the system components together. The memory 224 can include substantially any relevant memory such as the memory described above, and can store, data, programs, routines, executables, scripts, audio content, video content and the like.

The computer 220 can further includes one or more wired or wireless user interfaces 230 that interface and/or connect devices with the computer such as keyboard, pointing device, optical and/or audio detectors, touch screen, stylus, display and/or other such devices. The computer can further include ports and/or sockets 232 to couple with external devices 240 (e.g., external hard drive, printer, display, and other such external devices) and/or external wired and/or wireless networks 242, 244 to communicate with one or more remote servers 246, computers 248, databases 250 and/or other such devices.

Referring back to FIG. 1, the encoder 124 is typically configured to encode the content 126 according to a given standard or scheme that is well recognized, such as MPEG2 (Moving Picture Experts Group). Other encoding schemes are alternatively and/or additionally utilized, and some of these are typically employed for relatively higher bit rate content, such as high definition video content, high resolution content, and include MPEG4 part 10 AVC, VC-1 (WMV9), and other such encoding schemes. The encoding according to at least some of these standards is more complex than MPEG2, in part, because some of these standards, such as AVC and VC1, provide for a plurality of decoder requirements, such as pluralities of decoder buffer models to be satisfied for each encoded content 126.

The present embodiments, allow for the accurate encoding of content to satisfy a plurality of decoder models according to a desired encoding scheme. Further, some embodiments provide for accelerated encoding, in some implementations, by splitting the content stream across multiple encoders and/or processors while maintaining the quality of the encoded content 126. Still further, the present embodiments allow for user selected and/or automated selection of portions or segments of the encoded content to be revised and/or re-encoded, for example, to comply with one or more non-satisfied decoder models.

Figure 3:
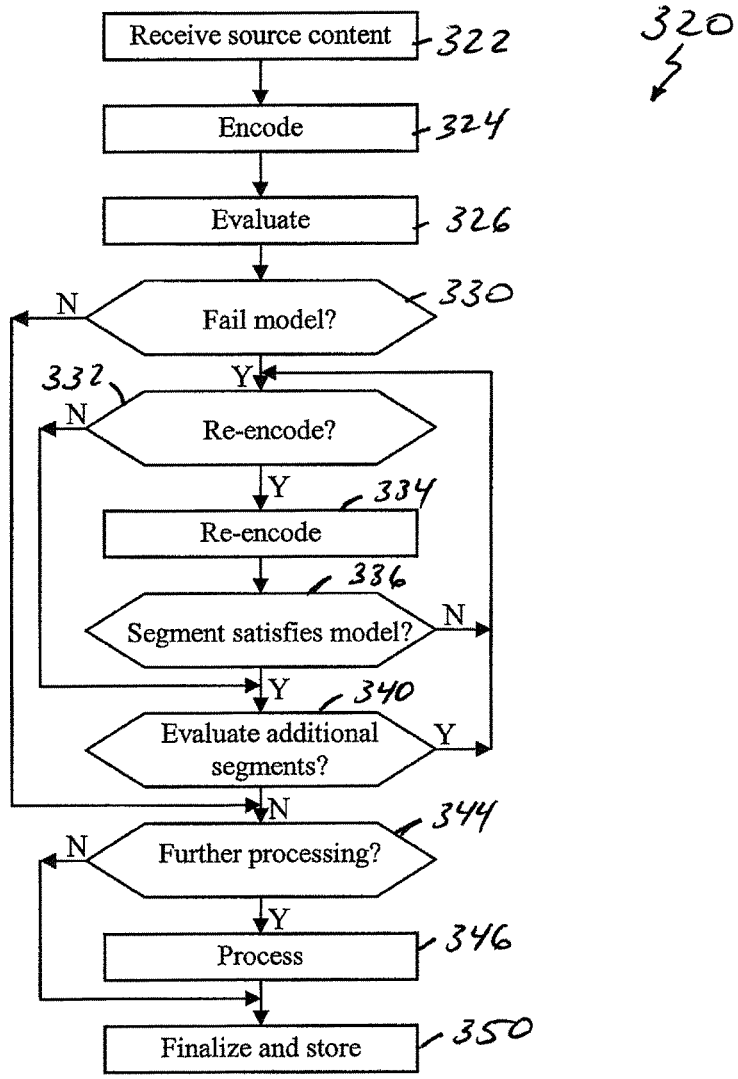
FIG. 3 depicts a simplified flow diagram of a process according to some embodiments for implementing an encoding to achieve an encoded content that satisfies one or more desired decoder models.

FIG. 3 depicts a simplified flow diagram of a process 320 according to some embodiments for implementing an encoding to produce an encoded content that complies with one or more desired decoder buffer models. In step 322, the source content is received. The content can be received from an recorded medium (e.g., tape, disc, or other such medium), the content can be initial content received from a recording device, the content can be acquired from a local data storage or from a remote data storage (e.g., accessed over a distributed network such as the Internet), and other such sources or combinations of sources. In step 324, the content is encoded according to the one or more decoder buffer models. In step 326, the encoded content is evaluated. The evaluation can be performed as the content continues to be encoded, or following a complete encode of the content. In step 330, the process determines whether one or more segments of encoded content fail to meet one or more of the desired decoder buffer models. In some implementations, one or more quality threshold levels, such as peak signal-to-reconstructed image comparisons as described below, are evaluated relative to the original content.

When one or more segments are identified in step 330 as failing to satisfy one or more models and/or fails to satisfy quality limits, the process enters step 332 where it is determined whether one or more of the identified segments are to be re-encoded. When a segment is to be re-encoded, step 334 is entered and the one or more identified segments are re-encoded. In step 336, the re-encoded segment is evaluated to determine whether the re-encoded segment satisfies one or more of the previously unsatisfied decoder buffer model. When the re-encoded segment fails to meet the models, the process returns to step 332 to determine whether the segment is to be again re-encoded. When the encoded segment does satisfy the model(s), the process enters step 340 and determines whether further segments are to be evaluated and/or re-encoded. When additional segments are to be re-encoded the process returns to step 332 to determine whether the one or more segments are to be re-encoded, and alternatively, when there are no further segments to evaluate the process continues to step 344.

In step 344, the process determines whether additional processing of the encoded content is to be performed, such as the inclusion of one or more chapter points (e.g., through a segment re-encode with the inclusion of an entry point) or other processing as described below. When further processing is to be performed, step 346 is entered where further processing is performed. Alternatively, step 350 is entered where the encoded content is finalized and/or stored. Upon finalizing and writing the content, those portions of the content that were re-encoded are written instead of the initially encoded content that failed to meet buffer model parameters and/or quality limits.

Limiting the re-encoding of content to segments of the content instead of having to re-encode an entire stream at least significantly reduces encoding time, increases processing speed, reduces processing overhead, improves overall encoding performance and verifies that the encoded content satisfies desired decoder buffer models, effectively satisfying one or more encoding standards, such as AVC, VC1, and/or other encoding schemes and provides other benefits as described above and further below.

Segment based re-encoding provided by some embodiments allows for the efficient replacement of portions or regions of encoded (e.g., compressed) content, such as video data, within a pre-existing encoded content stream with a segment that has been re-encoded according to one or more altered encoding parameters (e.g., encoded according to increased bit rates, transrating, and other encoding parameters or techniques) such that the resulting cooperated encoded content satisfies one or more standards and/or decoder models. Many previous systems typically required a re-encode of the entire video stream when one or more sections had errors and/or failed to meet decoder models. The re-encoding of the entire stream adds significant amounts of processing time to the encoding process and can dramatically reduce productivity. Some existing systems allow for a type of re-encoding according to the single, well defined and established standard of MPEG2. The re-encoding to satisfy MPEG2, however, cannot be applied to many other encoding standards, such as AVC, VC1 and many other encoding standards. This is due in part to the fact that MPEG2 only provides for satisfying a single buffer model, while other encoding schemes such as AVC and VC1 are defined such that encoded content in many instances satisfy multiple buffer models.

Some embodiments allow one or more individual segments of encoded content to be modified and re-encoded, and then the re-encoded segments are incorporated back into the main encoded stream. Thus, some embodiments avoid the need to go back and do a complete re-encode of the entire content stream (e.g., a two hour movie). Instead, the present embodiments allow a segment, such as a one minute segment, 30 second segment, 10 second segment, 1 second segment, less than a second and/or substantially any length segment to be re-encoded and incorporated back into the encoded stream drastically reducing the time needed to achieve an encoding of a content stream that satisfies desired parameters.

As introduced above, some embodiments allow content to be encoded to satisfy more than one decoder buffer model. These buffer models define how data is taken in and released out of the decoder. The present embodiments provide for segment re-encoding while still conforming to these generally strict standards (as typically spelled out in encoding specifications such as the specifications for AVC or VC1) where the resulting encoded stream satisfies a plurality of decoder buffer models. These decoder buffer models are typically different for AVC and VC1 than for MPEG2, because in part the MPEG2 encoding typically only has to satisfy an single buffer model, while encoded streams meeting AVC and/or VC1 standards can satisfy a plurality of models.

Satisfying the plurality of models provides for more flexibility on the decoder side because a decoder simply has to satisfy any one of the multiple models (leaky bucket models) allowing the decoder to decode the stream. Alternatively, in MPEG2, there is a single model to be satisfied. Further, the benefit of satisfying multiple models allows different decoders to decode the stream, e.g., some decoders may have a relatively fast fill rate but a relatively small buffer, while other decoders may have a relatively large buffer with a relatively slower fill rate. Typically, a decoder can access the encoded stream and identify up front whether the decoder can decode and playback the stream.

The system can further analyze encoded content to determine and/or verify whether one or more decoder buffer models and/or parameters are satisfied. The verification of satisfying models is performed, in some implementations, by simulating the behavior of decoders and the way those decoders decode a stream in terms of consuming data from an associated buffer. In some implementations, the system sequentially simulates one model at a time. Some implementations evaluate multiple or all of the potential models substantially simultaneously, by simulating the models in parallel. The system extracts the data from the simulations, whether performed sequentially or in paralleled, and then determines whether one or more decoder models fail.

To perform the simulation of the one or more decoders, some present embodiments employ one or more hypothetical reference decoders (HRD) that are, in some implementations, a mathematical model of one or more decoders and their input buffers. This HRD is defined according to desired standards to be met by the encoded stream, such as by one or both AVC and VC1 standards. Typically, for a given encoded stream to be compliant with the desired standard, the stream conforms to the reference models given the parameters of the models specified in the stream. The relationship between the decoder and its input buffer in the HRD is defined in terms of a "leaky bucket" buffer model. This buffer model specifies the parameters for how the buffer fills and is emptied in terms of bit rate (bits per second) and buffer fullness. For a stream to be compliant with, for example, AVC and VC1 it should specify one or more sets of decoder model parameters for which the HRD runs without exceeding the buffer fullness range.

The HRD in some preferred implementations can define multiple models at once for which the encoded stream is to conform. For example, the HRD can define 5, 10, 20, 100 or more buffer models with different fill rates and with different sizes, and the encoded signal is to conform to a plurality of these different buffers, and in some instances all of the different models.

The HRD performs a simultaneous verification of a plurality, and preferably all designated possible buffer models at once to see if one or more models fail. When one or more models are identified as failed, the system and/or user can go back and fix the stream, by performing a subsequent re-encode of one or more segments of the encoded stream. Alternatively, the system and/or user may determine or decide not to satisfy and/or cannot satisfy one or more models, due to the nature of the content at that particular point (at any one or more portions/sections), then the present system can change the parameter designations in the stream to identify that the encoded stream is actually supporting less than all of the buffer models according to a standard (e.g., AVC and/or VC1). For example, some embodiments maintain as meta data those decoder buffer models that are not satisfied by the encoded stream. Upon storing the encoded content, the models that are not satisfied by the final encoded content are not identified in a header or parameter data, or can be identified as unsatisfied in designation, header, and/or parameter data of the storage medium (e.g., a disc, compact disc (CD), digital versatile disc (DVD), other optically readable medium, and/or other mediums).

Typically MPEG2 systems during an encode specify "in" and "out" buffer levels for which the encoder is instructed to try and achieve. Often the buffer does not achieve the out-point correctly, and therefore down stream the buffer model fails. Some MPEG2 systems attempt to automatically implement another encode of the entire content stream at an altered bit rate in an effort to fix the one or more regions that failed the model so that eventually the entire stream is compliant. This has an effect of reducing the overall encoding quality of the entire stream.

Alternatively as introduced above, some embodiments attempting to comply with multiple models can identify when one or more segments of the content fails one or more of the plurality of models, and rather than subsequently initiating a re-encode instead just invalidates the buffer model that failed. Thus, some embodiments can avoid attempting a re-encode so that the encoded stream satisfies less than all models designated in a stream.

Figure 4:
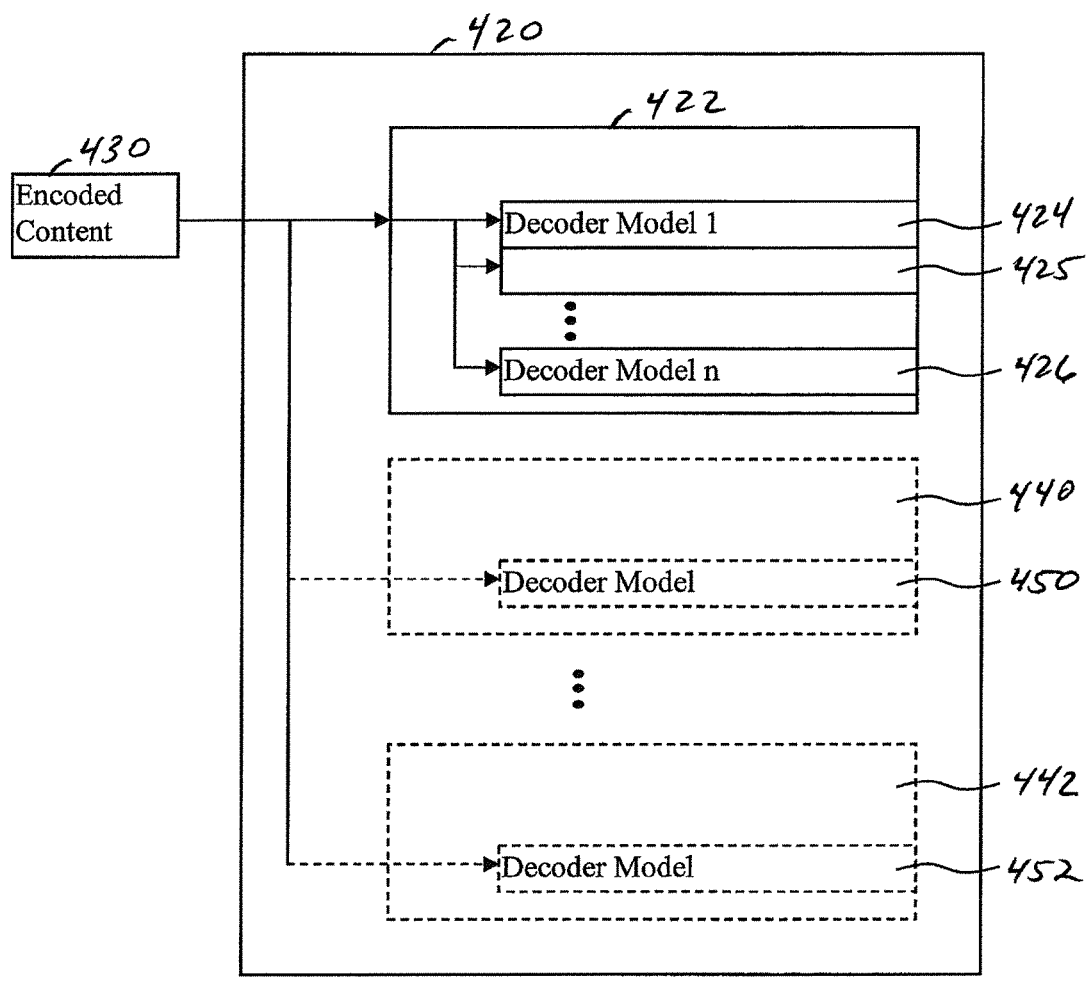
FIG. 4 depicts a simplified block diagram of a hypothetical reference decoder (HRD) model according to some embodiments.

FIG. 4 depicts a simplified block diagram of an HRD model 420 according to some embodiments. The HRD 420 includes a processor 422 with one or more of decoder models 424-426. In some embodiments, the processor 422 is implemented, at least in part through a process of an encoder, such as encoder 124. The processor 422 includes and/or accesses a decoder model for each model to be evaluated according to the standard (e.g., AVC, VC1, and the like). The processor 422 can be implemented through a computer or computer system (e.g., computer system 220), microprocessor, logic and other processing circuitry as is known in the art capable of implementing the desired decoder evaluation. In some embodiments, the decoder models 424-426 are implemented through software, for example as object oriented programs and/or vector of classes configured to mimic the processing requirements of a decoder according to defined buffer models (e.g., the fill rate, buffer size, and other parameters). In some embodiments, the HRD optionally incorporates a plurality of processors or computers 422, 440, 442, each with one or more decoder models 424-426, 450 and 452 such that the processing capacity for the HRD is distributed over the plurality of processors 422, 440, 442. The processors can be co-located and/or be distributed over a network, such as an intranet, the Internet, or other such networks.

The encoded content 430 is supplied to the HRD 420. Each element of the data set is fed to each decoder model 424-426 (and optionally 450, 452). The models each process that particular data serially or in parallel and look for errors occurring in the decoded stream. Upon evaluation of an element, the subsequent element is fed to the models and is evaluated. The system continues to loop back such that each element of the stream is directed to each decoder model 424-426 for evaluation, and the stream is fully evaluated. In some embodiments, the HRD 420 is employed to evaluate the encoded stream as the content stream 122 is being encoded. The HRD can, in some implementations, further provide predictive features of the content stream for use in encoding and configuring the encoded content. For example, the HRD can include a simplified encoder, such as an MPEG2 encoder, that processes the video content. Based on the encoding achieved through the HRD MPEG2 encoder the HRD is able to identify or predict estimated buffer levels, encoding rates for AVC, VC1, MPEG4 and/or other encoders, and other encoding parameters.

Figure 5:
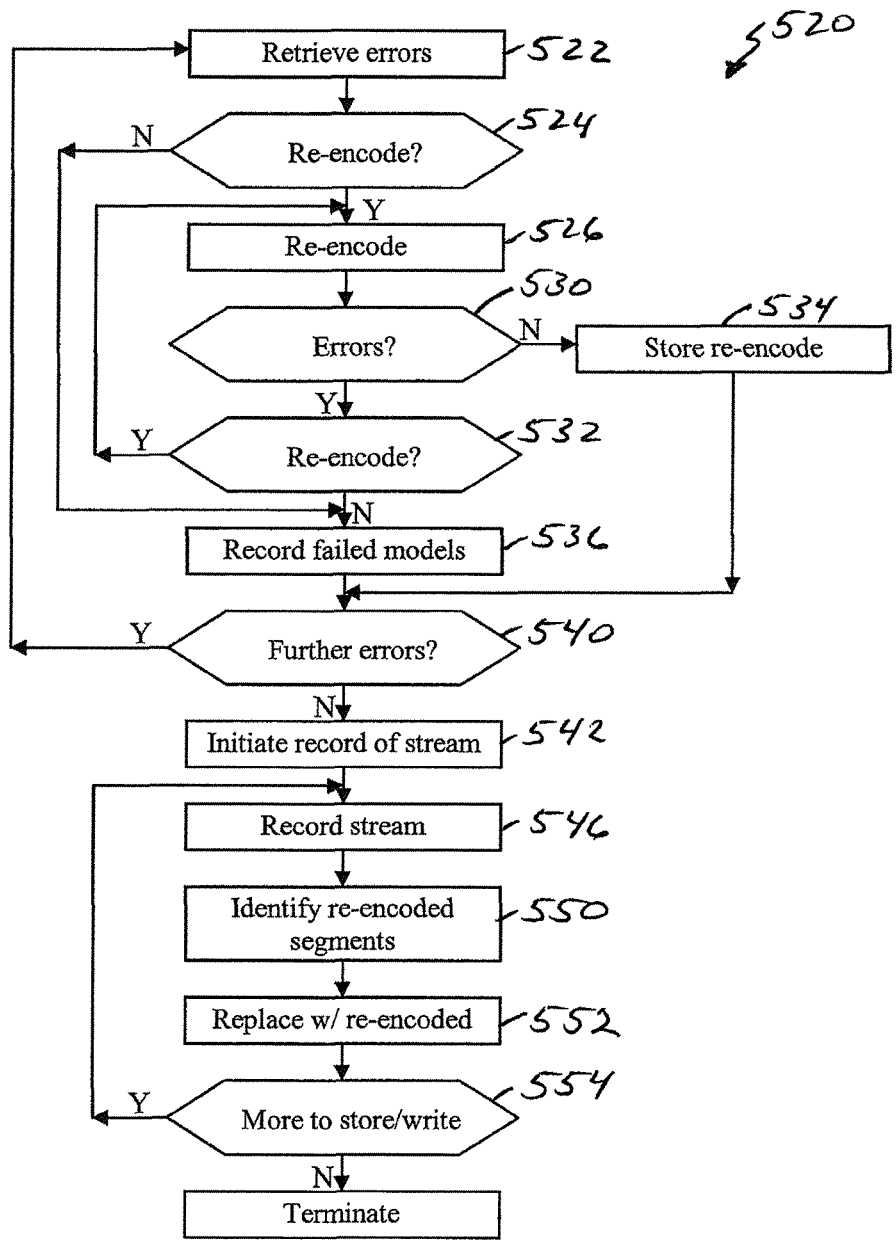
FIG. 5 depicts a simplified flow diagram of a process for determining whether a segment re-encode is to be performed.

FIG. 5 depicts a simplified flow diagram of a process 520 for implementing segment re-encodes. In step 522, errors identified through processing of the encoded content, such as through the HRD, are retrieved. In step 524, the errors are evaluated and the process determines whether one or more segment re-encodes are to be performed. The determination of whether a re-encode is to be initiated can be based on one or more factors. In some implementations, the determination of a re-encode is specified by a user. The system can identify areas where buffer models fail, and implement re-encode and/or allow a user to designate areas to be re-encoded. In some embodiments, the re-encodes can be initiated for substantially any segment failing to meet buffer models. Further, some embodiments limit the segment re-encodes to areas where the buffer model is not met and the subsequent re-encode does not degrade the quality of the segment below a threshold. Additionally and/or alternatively, the segment re-encode can be implemented when a quality falls below a threshold and sufficient bit resources are available to re-encode at higher bit rates. Other factors and/or conditions can be utilized to determine when re-encodes are to be initiated as are described below.

When the re-encode is to be performed, step 526 is entered where a re-encode is initiated for an identified segment. In step 530, the process determines whether one or more errors are detected for the re-encoded segment for one or more decoder models. If further errors are detected for the re-encoded segment, the process again determines in step 532 whether a subsequent re-encode of the segment is to be implemented. Again, many factors can and/or are reviewed to determine whether a re-encode is to be initiated, such as but not limited to, determining whether the re-encode significantly degrades the quality of the content (e.g., beyond a threshold), available bits, threshold levels and/or other factors. If a subsequent re-encode of the re-encoded segment is to be performed, the process returns to 526. Alternatively, when a subsequent re-encode is not to be performed the process skips to step 536.

When the re-encoded segment meets desired buffer models as determined in step 530, the process enters step 534 where the re-encoded segment is stored, in some embodiments the re-encoded segment is stored in a separate file or storage location. The process then continues to step 540. If it is determined in steps 524 and 532 that re-encoding is not to be performed for segments where errors are detected, buffer models that fail for the identified one or more segments are recorded as failing in step 536. In some instances the failed buffer models are stored in a separate file. In step 540, the process determines whether further errors are to be evaluated for re-encode. When additional errors are to be evaluated, the process returns to step 522, otherwise the process continues to step 542.

In step 542, the recording of the encoded stream is initiated where the decoder buffer models identified in step 536 as failed for one or more decoder models are removed from a header of the stream and the buffer models that the encoded stream satisfy are recorded. In step 546, the recording of the encoded content is begun. In step 550, those segments that have been re-encoded are identified during the recording of the content. In step 552, the process replaces the initially failed encoded segments or other segments that were re-encoded with and/or stitches in the re-encoded segments (e.g., retrieves the re-encoded content from a separate file and replaces the failed segment with the retrieved re-encoded segment), and write the re-encoded segments. In step 554, the process determines whether further encoded content is to be written and returns to step 546 to continue writing the encoded content and the re-encoded content. Alternatively, the process terminates.

In some implementations, for those segments that fail to satisfy decoder buffer models and a re-encode of that segment does not achieve a desired quality and/or still fails to satisfy the desired decoder buffer model, the content stream proximate the failing segment is further evaluated and/or re-encodes of neighboring segments are further implemented. By re-encoding surrounding segments of the segment of interest, the buffer model requirements for the segment of interest can be reduced such that the re-encoded segment satisfies in and/or out rates of the buffer model. Further, the re-encoding of neighboring segments can be utilized to simplify or more readily allow the incorporation of the re-encoded segment back into the encoded stream following the re-encode.

Some embodiments improve the encoding process and processing time by allowing for the re-encoding of just segments of content instead of requiring a complete re-encoding of an entire stream, and incorporating the re-encoded segments into the final encoded content so that the stream satisfies the desired encoding standard and/or the desired decoder models. Further, some embodiments can prevent unnecessary re-encodes that would be needed to satisfy one or more invalidated buffer models for models that are not desired and/or cannot be satisfied without significantly degrading the overall quality of the content. For those models that are not desired and/or cannot be satisfied without degrading the quality beyond a threshold (which can be user defined, system defined, buffer model defined), some embodiments provide for the identification of those buffer models that are not satisfied and invalidate those models for the content stream. By simply identifying and/or invalidating the decoder model parameter sets that are not satisfied following a re-encode, for example due to not achieving a target segment out point buffer level for a given re-encode, the system improves overall content quality, reduces processing overhead, and reduces processing times.

As introduced above with respect to FIG. 5, some embodiments improve processing time and reduce processor overhead by cooperating or stitching the re-encoded segments back into the encoded stream of content when the processing of the encoded stream is complete and the encoded content is to be written as a final form (e.g., writing to a DVD or other medium). In these embodiments, the initial base encode is performed followed by the identifying of the segments that are to be re-encoded, performing the re-encodes and maintaining the re-encoded segments in one or more separate files, and generating links to identify where in the encoded stream the re-encoded segments are to be incorporated. When the re-encodes and other processing is complete and/or when a user is satisfied with the encoded end result, the encoding process is finalize where those models that are invalidated are identified, the one or more re-encoded segments are stitched back into the encoded stream replacing those segments identified to be re-encoded, and the invalidated models and the entire revised encoded stream are stored. The invalidation of one or more models may vary from coding scheme to code scheme. For example with AVC, the invalidation of models can be achieved in some implementations by reconstructing an hrd_parameter data structure in the stream with new data that does not contain the invalidated model parameters. Some embodiments further allow the user and/or the system to implement additional segment re-encodes, full re-encodes and/or other processing after finalizing the encoded content, and then re-finalizing again for storing of the altered encoded stream.

In evaluating a stream of content that has been encoded, some embodiments can determine whether the encoded stream satisfies desired decoder models and/or determine a quality or degradation of the signal due to encoding. Some embodiments implement a comparison of the decoded stream (e.g., decoded through the HRD) with an original content stream, an evaluation of the picture quality, an evaluation of the quality of picture parameters, and/or other evaluations or combinations of evaluations. For example, in some implementations, the evaluation of the picture quality following an encoding is achieved by employing Just Noticeable Difference (JND) methodology or algorithm that quantifies the picture quality impairments associated with compressed video applications. JND is sensitive to a variety of picture defects and works over a range of picture qualities resulting in predictions that attempt to closely match human visual evaluations. Additionally and/or alternatively, algorithms that approximate the results of the JND methodology (e.g., Sarnoff) can be employed.

Signal to noise ratios (SNR) and/or peak signal-to-reconstructed image (PSNR) comparisons can additionally and/or alternatively be employed to determine the encoded quality. PSNR is essentially a measure of quality, distortion and/or a determination of how closely the encoded content after being decoded matches the original content. Other encoding and/or image evaluations can be utilized as are known in the art to determine the quality of the encoded content, such as identifying areas of frames where motion vectors are diverse or varying; evaluating compression scheme formation vectors; evaluating values of quantization, macroblock effects, areas with redundancy, and other factors to identifying blocks that potentially are more likely to exhibit error for measuring the quality of encoding; and other methods for assessing quality or combinations of methods can be utilized.

In determining the quality of the content the system in some implementations obtains the quality data (e.g., JND and/or PSNR data) as a part of the encode process by performing a partial decode of the content during the encoding. Typically, the partial decode can be initiated prior to a complete encoding of the content, but at a stage where at least some of the negative effects of encoding the content can be evaluated. The partial decode produces content that can be evaluated and/or produces substantially fully decoded frames that are then evaluated (e.g., PSNR value(s), JND value(s), and/or some other measure of distortion). Typically, encoding is a layered set of encoding processes, utilizing for example, discrete cosine transform (DCT), inter frame compression going from one frame to another, entropy encoding, quantization, and/or other encoding layers. The partial decode can be initiated for example through the HRD 420 to evaluate the stream at a time between one or more layers of encoding to generate the desired PSNR, JND or other evaluation results. The evaluation results are then compared with threshold levels to obtain a measure of encoding quality that can be returned to the encoding processor.

The selection and use of PSNR, JND and/or other parameters for evaluating the quality of the encoded signal can depend on many factors, including processing capabilities and/or overhead, expected run times, the speed at which results are needed and other factors. For example, when evaluating encoded content at real time rates, the system may limit the evaluation to PSNR as determining PSNR typically employs an algorithm that is relatively quick. In instances where speed of evaluation is not as critical and/or signal processing capabilities are sufficient, JND evaluations may be used.

Some implementations utilize a plurality of comparisons and/or quality evaluations, such as using both PSNR and JND. The system can, in some implementations, further allow a user to select which one or more comparisons are employed to evaluate the encoding and to determine quality. Similarly the user can specify a weighting between multiple algorithms and/or comparisons (depending on the advanced level of the user), and further, the amount of processing power to be utilized.

The evaluation can be performed on an entire frame, with evaluations implemented on a frame by frame basis, sub-frame by sub-frame basis, or groupings of frames. To compensate for processing speed and/or processing overhead, in some implementations, the system employs a statistical sampling mechanism to randomly, arbitrarily, and/or selectively take one or more blocks of content within a particular image and sample the current PSNR value, the JND value and/or other evaluation techniques, for the one or more blocks. The sampling allows for a statistical mapping to be generated of overall distortion of the image being sampled. In some implementations, the sampling provides sufficient information to accurately evaluate the encoded signal and to provide adjustments to the encoding levels. In selecting the blocks to sample and/or to guide the evaluation, some embodiments check for regions where motion vectors vary or are moving relatively widely, compression scheme formation vectors, values of quantization (where coarse values of quantization can imply relatively large amounts of compression), and other factors to identify blocks that potentially are more likely to provide a relatively accurate representation of encoding quality and/or exhibit one or more error(s) for measuring the quality of encoding.

Figure 6:
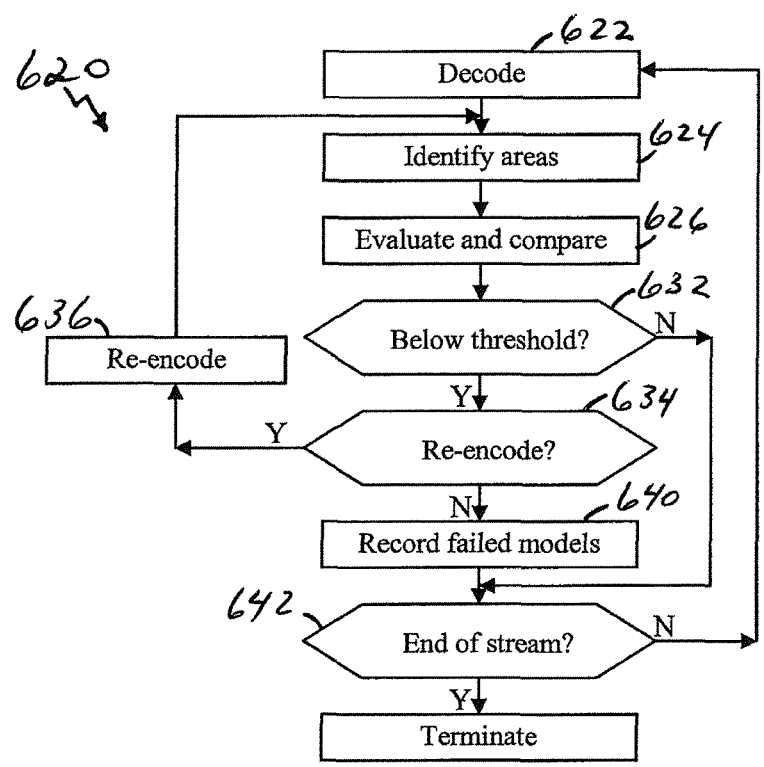
FIG. 6 depicts a simplified flow diagram of a process for evaluating encoded content.

FIG. 6 depicts a simplified flow diagram of a process 620 for evaluating encoded content. In step 622, at least a portion of the content stream is decoded as the stream is being encoded. In step 624, one or more areas within a frame or picture are identified such as areas of relatively high compression. In step 626, at least those areas identified are evaluated, and the results of the evaluation are compared with one or more threshold levels. In step 632, the process determines whether the results meet or exceed (or fall below depending on the parameter being evaluated and/or the threshold limit)

the one or more threshold levels. When the results of the evaluations meet the thresholds, and thus quality levels are satisfactory, the process skips to step 642.

Alternatively, when the quality falls below threshold limits, the process enters step 634, where it is determined whether a re-encode is to be performed. Again, this determination can be made by the process and/or system based on the threshold levels. Alternatively, the system can identify those areas of the encoded stream with potential quality problems and allow a user to select those segments to be re-encoded. For example, a report and/or time line can be generated that identifies those areas with potential quality problems, with relatively high compression, where decoder models fail and/or potential errors occur, and/or other relevant information. When a re-encode is to be initiated, the process enters step 636 where a segment re-encode is initiated. Following the re-encode, the process returns to step 624.

When a re-encode is not to be performed, step 640 is entered where the one or more decoder models that have failed for the identified segments are recorded. In step 642, the process 620 determines whether the end of the encoded content stream has been reached. If not, the process returns to step 622. Otherwise the process terminates.

As is known in the art, some encoding schemes and/or standards, such as AVC, VC1, MPEG2 and other encoding schemes reduce the amount of data that has to be maintained by defining one picture or frame by referencing one or more different frames. For example, a first frame can reference a second frame and define changes that are to be made to the second frame to achieve the first frame. As a further example, the AVC compression scheme typically relies on inter frame prediction of frames for significant coding efficiency gains. The type of inter prediction depends on the frame type, whether a P-frame (predictive frame), a B-frame (bi-directionally predictive frame), an I-frame (intraframe), or other defined frame type. P-frames typically can be predicted from one other reference frame, and B-frames typically can be predicted from a combination of two other reference frames. Some embodiments in implementing a segment re-encode attempt to avoid disrupting inter prediction schemes between multiple frames, and/or re-designate the referencing to provide accurate decoding.

For example, some encoding specifications, such as AVC, specify how the management of referenced frames is to be maintained and implemented by defining reference frame lists (for AVC two reference frame lists are typically maintained, some times referred to as L0 and L1) that are used to store indexes of reference frames. A decoder during decoding maintains storage of reference frames indexed by either L0 or L1. When decoding a frame, the lists L0 and/or L1 are accessed to identify other frames that are references for the decoding of the frame of interest to locate appropriate reference frames for use in reconstructing the frame of interest.

Further, in some encoding schemes, such as MPEG2, frames of pictures are grouped together (called a group of pictures, or GOP), such as when the content is visual content. Because of the organization and/or structure of a GOP, which typically start with an I-frame, include P-frames at regular intervals through the GOP and one or more B-frames between each pair of I/P frames, and does not allow inter prediction between closed GOPs, the encoding scheme provides convenient intervals for employing segment re-encodes. With MPEG2 it is typical to have GOPs that are relatively short or contain a relatively small number of frames. For example with MPEG2, a GOP typically includes about 13-15 pictures or frames equating roughly to about a half second interval of time during playback (when playing back at 30 frames per second, i.e., $15/30$ per second or about ½ second). The relatively short GOPs simplify the identification of re-encoding start and end points with MPEG2.

Other encoding schemes, however, such as AVC, VC1 and other relevant encoding schemes often do not define GOP structures or have GOP structures that are typically much larger and/or longer relative to MPEG2 GOP structures. For example, GOP structures for AVC can in some instances include 150 or more frames or pictures (which typically include multiple I, B, P and/or IDR frames). As a result, when re-encoding according GOPs encoded with a scheme such as AVC or VC1, the re-encoding can result in large numbers of pictures being re-encoded, which can be computationally expensive and time consuming. Further, a long GOP is often an inconvenient or difficult level of granularity for re-encoding.

Some embodiments provide for the ability to initiate a segment re-encode within a GOP and/or at sub-GOP levels to reduce the length of a segment that is to be re-encoded, reduce the processing overhead, as well as reducing processing time. The initiating of a re-encode within a GOP or at sub-GOP levels of granularity is achieved by identifying start and end pictures or frames within a stream that bound a series of frames to be re-encoded where frames outside these start and end picture bounds do not reference frames within these bounds, and/or by upgrading a P- or B-frame to an I-frame to starting the re-encode at that upgraded P-frame or B-frame.

Figure 7:
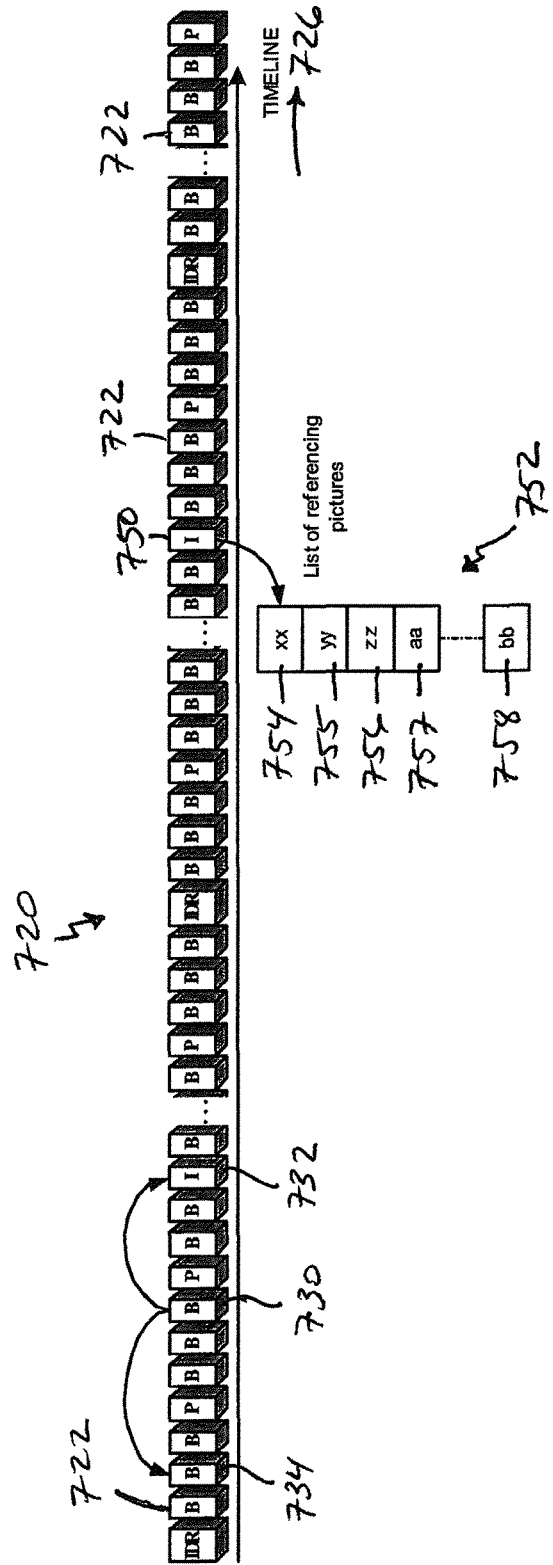
FIG. 7 depicts a simplified time line representation of a portion of a stream of content comprising a plurality of pictures or frames.

FIG. 7 depicts a simplified time line representation of a portion of a stream of content 720 comprising a plurality of pictures or frames 722. The time line is an index representation of coded pictures. For ease of access and user understanding, the time line in some implementations can be generated relative to time display order 726 as apposed to an encode order. As indicated above, the frames are typically defined according to a frame type and in the example of FIG. 7 are designated as I-frames, B-frames, P-frames and IDR-frames. Prior to initiating a segment re-encode, some embodiments evaluate segments of the stream 720 relative to portions to be re-encoded to determine if and where re-encoding can be implemented in attempts to avoid disrupting the picture referencing and/or dependency.

Some embodiments evaluate the frames 722 of the stream 720 to identify one or more segment re-encode start or in-points, and one or more end or out-points. In some instances, for example when satisfying AVC, the reference lists L0 and L1 are utilized to determine other frames that a frame of interest references (e.g., frame of interest B-picture 730 references an I-picture 732 four frames into the future and a B-picture 734 five frames in the past). The reference lists L0 and/or L1 are accessed to determine one or more reference pictures into the future and/or one or more reference pictures into the past.

As described above, some encoding standards provide for the referencing of multiple frames and reference lists are used to store an index of reference pictures. A decoder maintains storage of reference pictures and uses the lists to look up the reference frames to implement prediction. During the segment re-encode, some systems attempt to avoid disrupting the referencing to other frames or pictures. In evaluating the stream 720 some embodiments attempt to identify appropriate re-encode start points and/or end points by determining whether pictures outside a proposed segment are referencing pictures within the proposed segment to be re-encoded. In some implementations, an index is generated containing information, such as a data structure, that contains information relevant to the pictures of the stream, such as a picture type (e.g., I, B, P, IDR), duration, size in bits, in some instances a buffer state (e.g., such as the HRD buffer state), and/or other relevant information. The index for a picture can also contain an index or listing 752, such as a timeline index, of the other pictures 754-758 in the encoded stream that reference that picture.

This list 752 of other pictures can be stored in many different formats and/or configurations, and in some implementations is stored as metadata, and/or a list attached with time line picture data structures. For example, FIG. 7 shows an I-picture 750 with a reference list 752 that identifies each picture 754-758 that is referencing that I-picture 750. This index allows the system and/or user to quickly and easily identify other pictures referencing a picture being considered.

The index 752 of pictures referencing a picture can include substantially any number of pictures. For example, a frame of content that generates a display screen that is entirely black that is positioned at the beginning of a stream or GOP can be referenced by all other black frames in the stream or GOP. In some implementations, however, particular profiles and levels of encoded stream can set up limits on the number of pictures that can reference a picture.

The list 752 simplifies the evaluation of the stream 720 to identify potential start points and end points of a segment or sub-GOP that is to be re-encoded. A search algorithm can be employed that identifies the pictures that reference a picture of interest by accessing the reference list 752. Additionally and/or alternatively, the systems can employ an algorithm that is used to determine the pictures that a picture of interest references.

The re-encode segment identification algorithm identifies segment start and end points along the stream of content 720. Some embodiments attempt to identify start and end points at or near the portion of the stream that is identified to be re-encoded. Further, some embodiments set a limit defining a reasonable position or number of pictures away from the segment identified to be re-encoded. For example, when a user selects to start a re-encode at about a time "T" (e.g., about 50 seconds into the stream), the user is going to expect the start point of the segment re-encoded to be around that "T" point. Therefore, the limit attempts to ensure the determined start point is proximate the requested start point. Some embodiments identify a plurality of potential start and end points. Based on the plurality of potential start and end points, the user can select which points to use.

Figure 8:
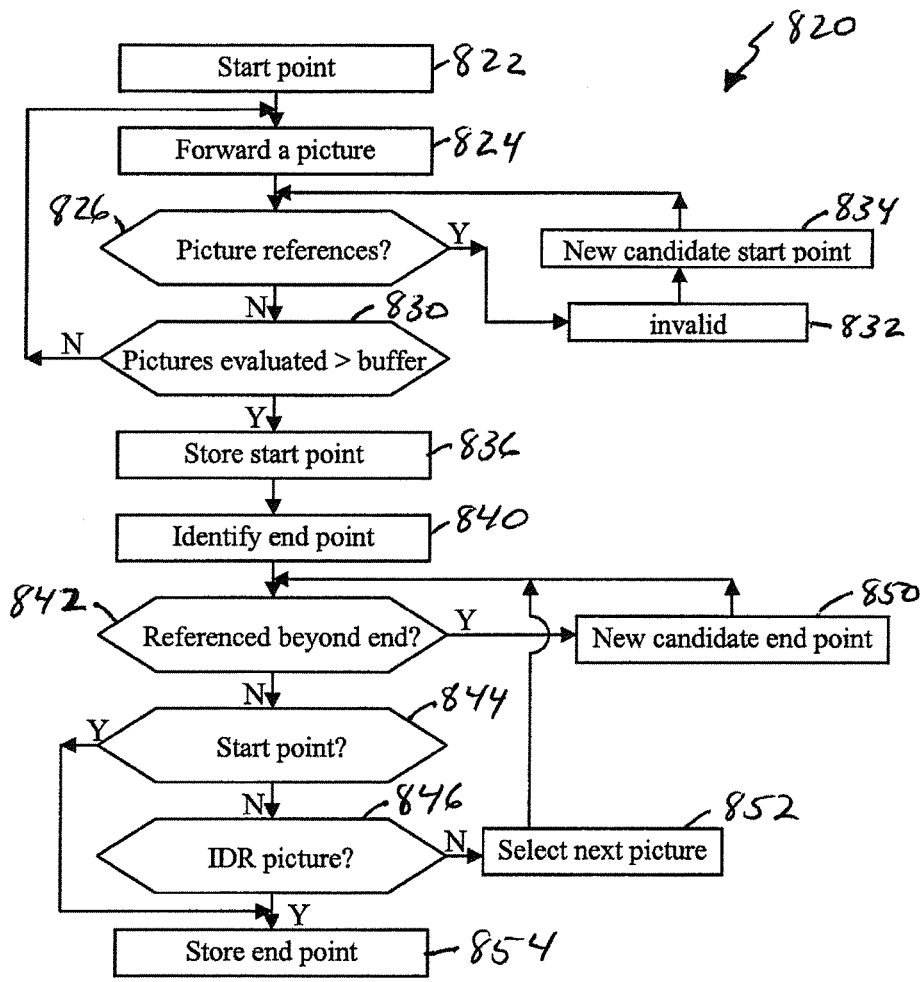
FIG. 8 depicts a simplified flow diagram of a process for use in identifying segment re-encode start points and end points according to some implementations of the present embodiments.

FIG. 8 depicts a simplified flow diagram of a process 820 for use in identifying segment re-encode start points and end points according to some embodiments. Referring to FIGS. 7 and 8, in step 822, a candidate start point picture is identified relative to a segment that is identified during the evaluation of the stream of content 720. For example, step 822 can include determining whether there is an I- or IDR-picture within a predefined limit of the segment identified to be re-encoded (such as a segment identified in step 534), selected by a user, an identification through a comparison with the original content, and/or other methods of identifying a candidate picture. In step 824 the process 820 scans to a subsequent picture relative to the selected candidate start picture, for example, forward on the time line 720 one picture.

In step 826, the reference list 752 for the picture being evaluated is accessed when available to determine whether a picture previous to the identified candidate start point picture references the picture being evaluated and thus is outside the potential segment or other evaluations are performed to determine reference pictures. If it is determined that one of the scanned pictures is referenced by a picture previous (e.g., to the left in FIG. 7) to the candidate start point, the process enters step 832 where the candidate start point is defined as an invalid start point. In step 834, a new candidate start point is selected (e.g., a picture previous to (in FIG. 7, to the left) of the previous candidate) and evaluated. Typically, the subsequent candidate start point picture is at least the picture identified in step 826 or previous to that picture. This evaluation attempts to ensure that the segment is self contained, and pictures outside the segment are not referencing pictures within the segment because of the potential changes that are likely to result to the pictures within the segment following the re-encode. The process then returns to step 826 to evaluate the subsequently selected candidate start point.

When it is determined in step 826 that the picture being evaluated is not referenced by a picture beyond the candidate start point, step 830 is entered where the number of forward pictures evaluated is compared with a predefined threshold, such as to the size of a decode picture buffer. Typically, the evaluation forward does not need to go beyond the size of a decode picture buffer because a decoding system typically would not reference a picture beyond this point because the referenced picture is to be decoded before the current picture is decoded.

When it is determined in step 830 that the number of pictures evaluated from the candidate start point does not equal or exceed the threshold (e.g., buffer size), the process returns to step 824 to evaluate another picture within the segment to be re-encoded. Alternatively, when the number of pictures evaluated equals or exceeds the limit and the pictures are not referenced by pictures previous to the candidate start point, step 836 is entered where the candidate start point is defined as a valid start point.

Once a candidate start point is identified as valid in step 836, an end point picture of the segment to be re-encoded is identified. In step 840, an initial end point candidate is selected and the system scans backward through the pictures of the candidate segment from the candidate end point until the identified start point picture, an IDR-picture (e.g., with AVC) or other indicator is reached to further determine whether pictures outside the proposed re-encode segment reference pictures within the segment. As indicated above when evaluating the start point, the pictures evaluated from the start point forward is typically limited to the size of the decode picture buffer. When evaluating the pictures back from the candidate end point there typically is not a limit to the number of pictures that are evaluated, and in some instances the pictures all the way back to the start point picture are evaluated. Reference pictures, however, typically do not reference pictures beyond an IDR-picture in a backwards direction for many encoding schemes such as VC1 and AVC. An IDR-picture is intra predicted and thus does not reference other pictures. In addition, the arrival of an IDR-picture typically causes a decoder to flush currently stored reference pictures, and thus, subsequent decoded pictures in decode order typically do not reference a picture prior to the IDR-picture.

In step 840, a candidate segment re-encode end point is selected. Again, the end point is selected near a segment identified to be re-encoding, and can be selected by a user, can be an I- or IDR-picture proximate the segment to be re-encoded and other selection methods. In step 842, the process 820 determines whether the picture being evaluated is referenced by a picture beyond the identified candidate end point picture (e.g., to the right of the candidate in FIG. 7). In some embodiments, the evaluation in step 842 is simplified by using reference list(s) 752. If the picture being evaluated is referenced by a picture beyond the candidate end point a new candidate end point is selected in step 850 and the process returns to step 842 to evaluate pictures relative to the new candidate end point.

When it is determined in step 842 that the picture being evaluated is not referenced by a picture beyond the candidate end point, step 844 is entered where it is determined whether the picture being evaluated is the segment re-encode start point picture identified in step 836. If the picture being evaluated is the start point picture, the process continues to step 854, otherwise the process moves to step 846. In step 846, the process determines whether the picture being evaluated is an IDR-picture. If the picture is not an IDR-picture, the process continues to step 852 to select the preceding picture and then returns to step 842 to reevaluate the selected preceding picture.

In steps 844 and 846, when it is determined that the picture being evaluated is the start picture or an IDR-picture, the process identifies the candidate end picture as a valid segment re-encode end picture in step 854 defining the bounds of the segment to be re-encoded. Typically, pictures do no reference pictures beyond an IDR-picture in a backwards direction due to flushing of caches and the like, and thus, the evaluation can be halted at an IDR picture and the candidate end point picture is identified as valid thus establishing the bounds of a segment to be re-encoded.

In some implementations, the selection of candidate start point pictures in step 822 is limited to I-frames, at least in part to limit the referencing that the candidate start point picture has to implement, where pictures prior to the I-frame do not reference that I-frame or pictures beyond the I-frame. Alternatively, some embodiments allow the candidate start point pictures to be B- and/or P-pictures. For example, a B-picture typically references one or more frames that have already been decoded before the B-picture can actually be decoded. As such, some embodiments in implementing the re-encode starts a re-encode and resets or redefines the referencing of the B-picture so that the B-picture is replaced with an I-picture that does not reference previous frames. Therefore, some embodiments compensate for long GOPs (e.g., GOPs in AVC and VC1 encoding schemes) by defining sub-GOPs and re-encoding the sub-GOP.

Prior to generating an I-picture and/or converting a B- or P-picture to an I-picture, some embodiments verify that the buffer and/or processing overhead associated with the upgrading to the I-frame is available. For example, the selection of the P-frame to be upgraded is selected and is verified that there is sufficient processing buffer overhead to allow for the conversion to the I-frame. Evaluating the overhead needed for the conversion includes, at least in part, a verification that available buffer levels relative to the picture to be converted are sufficiently high to allow enough data to be extracted during a later decode.

The system can utilize data generated in verifying the various buffer models (e.g., verifying through the process 520 of FIG. 5). The verification data can further be used to determine amounts of headroom and/or overhead available for converting a P- or B-frame to an I-frame. One or more overhead thresholds can be employed to evaluate potential candidate start points such that the encoder incorporates one or more control algorithms to anticipate overflowing the buffer, and in instances where the processing and/or buffer levels are near maximum buffer levels or within threshold limits of the maximum buffer levels the system avoids converting B- or P-frames to I-frames. As such, these embodiments limit and/or avoid the need for the re-encode to be at relatively low levels or bit rates that could result in poor quality. Some embodiments review one or more previous B-to-I frame size ratios to get a prediction of the change in picture size (bits) when converting the current B-frame to an I-frame. The predicted change in picture size is compared with the available space in the buffer. When there is sufficient space, and usually an excess of space to provide a margin of error, the system implements the change from the B- or P-frame to an I-frame and evaluates the buffer levels to determine whether the levels have been exceeded. When the levels are exceeded a segment re-encode can be performed to adjust the size or the conversion is not utilized. Alternatively, instead of predicting the change is picture size, some embodiments implement the conversion from B- or P-frame to an I-frame and then evaluate the buffer size to determine whether a failure occurs and/or re-encoded is to be performed.

In implementing the re-encode and incorporating the re-encoded segment(s) into the main content, some embodiments evaluate a buffer model to determine whether valid re-encodes can be implemented at desired segments and/or whether buffer models can be adjusted to allow for the desired re-encoding while still satisfying model standards and/or specifications.

Figure 9:
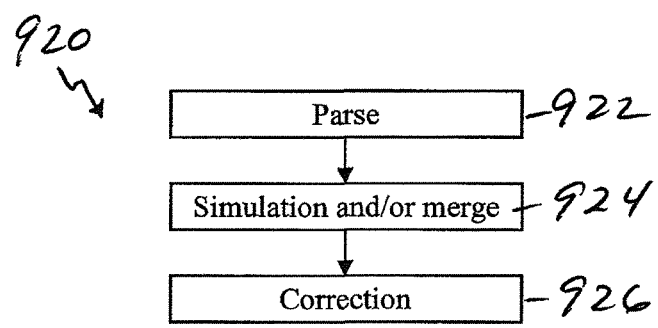
FIG. 9 depicts a simplified flow diagram of a process for use in determining and implementing buffer model evaluations relative to a re-encode.

FIG. 9 depicts a simplified flow diagram of a process 920 for use in determining and implementing buffer model evaluations relative to a re-encode. In step 922, the process parses the content stream (e.g., during a base or initial encoding) and identifies parameters and/or meta-data used in a buffer model analysis and simulation. In step 924, buffer model processing is implemented that includes a simulation of buffer model operation (e.g., effects on the buffer due in part to changes in bit-rate or buffer size) and/or in merging of parameters and/or meta-data of the re-encoded segment and the content stream. In step 926, one or more buffer model fields are corrected in the stream.

Buffers can be modeled according to "leaky" bucket models. A leaky bucket model can, in some instances, be characterized by three parameters a transmission bit rate (R), a bucket size or decoder buffer size (B) and a buffer fullness (F). In some implementations the transmission bit rate R can be based on a peak transmission bit rate (in bits per second) when bits enter the decoder buffer. In constant bit rate (CBR) scenarios, the bit rate R is often the channel bit rate and/or the average bit rate of a video, video segment or video clip. The size of the bucket B or decoder buffer (in bits), which can smooth bit rate fluctuations, typically is maintained at a level less than a physical buffer of an expected decoding device. The buffer fullness F can be defined by an initial decoder buffer fullness (in bits) before a decoder starts removing bits from the buffer. In some instances, an initial start-up delay (D) can be defined by the fullness F and bit rate R where the delay $D=F/R$ seconds.

Figure 10:
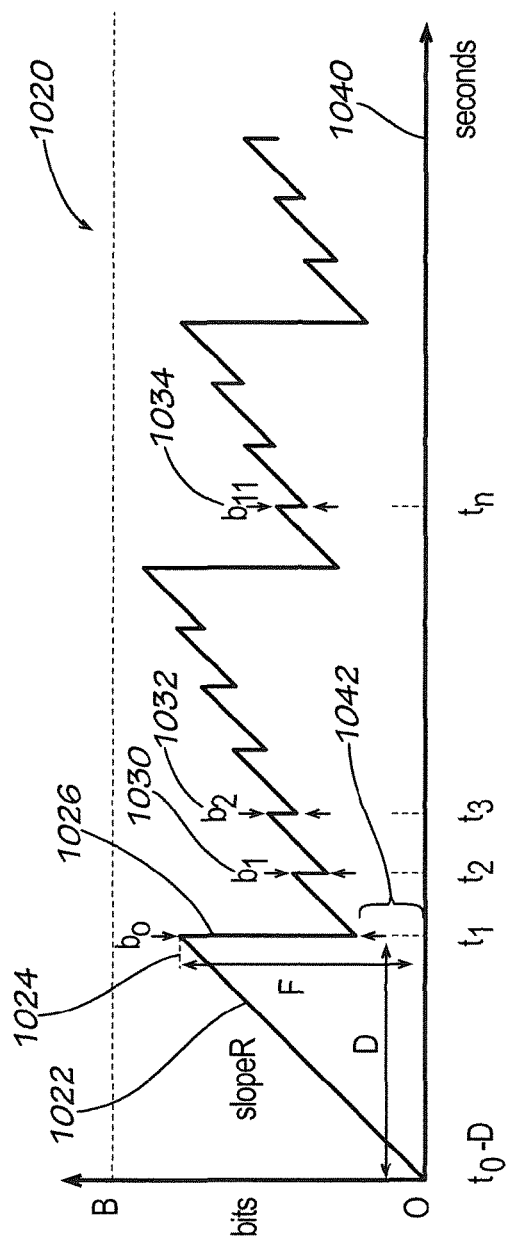
FIG. 10 shows a simplified graphical representation of a leaky bucket model.

FIG. 10 shows a simplified graphical representation of a leaky bucket model 1020. Typically in a leaky bucket model, bits enter a buffer at rate R represented by a slope 1022 until a level of fullness F 1024, and then an initial number of bits b(0) 1026 for a first frame are removed at a time t1. The bits continue to enter the buffer at the bit rate R. A decoder continues to remove bits b(1) 1030, b(2) 1032, . . . b(n−1), b(n) 1034 for subsequent frames at given time instants (e.g., t2, t3, . . . tn, respectively). Typically in a system providing constant bit rate (CBR), the slopes 1022 are substantially equal representative of the constant bit rate with a fixed predetermined rate during data transfer. With variable bit rates (VBR), many systems operate by supplying content at substantially a maximum rate until the buffer fills, and then waits to resume filling, in some instances following a removal of bits from the buffer.

Figure 11:
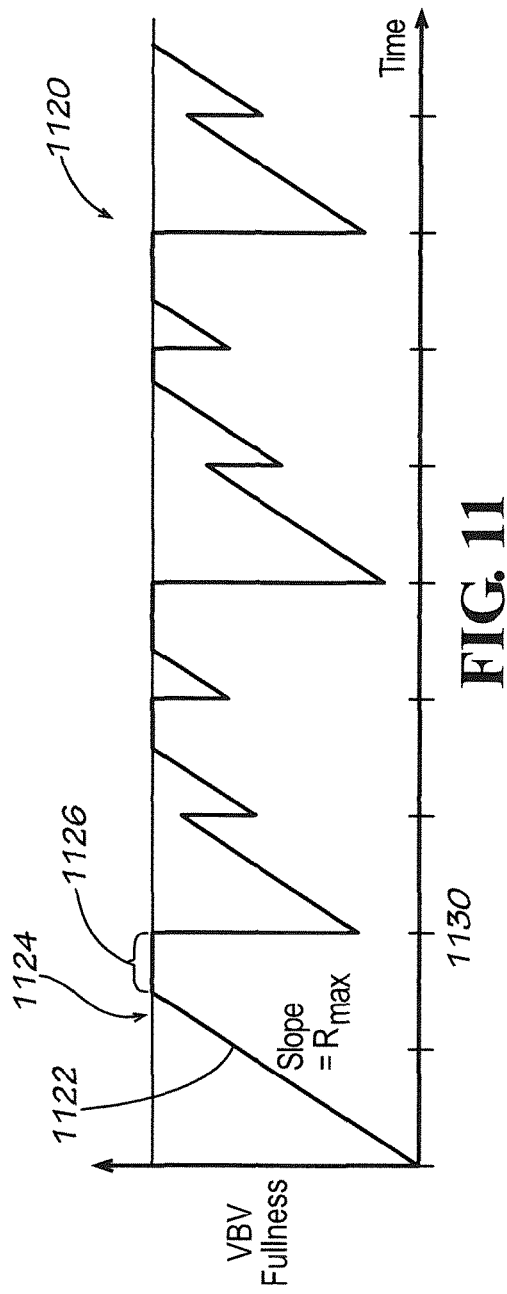
FIG. 11 shows a simplified graphical representation of a leaky bucket model according to a variable bit rate.

FIG. 11 shows a simplified graphical representation of a leaky bucket model 1120 according to a variable bit rate. The bits are supplied at about the maximum fill rate represented by a slope 1122. The bits are supplied at the rate until the buffer is full 1124. During a period 1126, bits are not supplied to the buffer. Following the removal of bits at 1130 bits are again supplied to the buffer at substantially the maximum rate.

In implementing the parsing phase 922 of the process 920, some embodiments identify, collect and/or extract parameters or data about the content stream. Based at least in part on the parameters a leaky buffer model can be represented, for example, by the following structure, referred to below as "bufferModel":

autc: Access unit time increment (invert frame rate);
bitrate: Bits stream rate specify the coded data is supplied to the input of the HRD;
vbvsize: Size of the HRD buffer;
iscbr: Flag indicating CBR stream; and/or
lowdelay: Flag indicating low delay mode.

The lowdelay flag indicates (e.g., when set to "1") that the sequence does not contain B-pictures, that the frame reordering delay is not present in the video buffering verifier (VBV) description, and/or that the bit stream may contain "big pictures", where decoding a picture at the normally expected time might cause a VBV buffer to underflow.

In some implementations when applied, for example, with AVC and/or VC1, a stream can have multiple leaky buffer models. An encoder can create a video bit stream that is contained by some desired leaky buckets, or it can simply compute the sets of parameters after the bit stream has been generated. During the parsing process, the following information can be collected for each access unit: the picture size, the picture type, the picture position, the timing information and/or some information specific for each codec. Based on the information identified through parsing and on the leaky buffer model, a value of the buffer level for each access unit can be determined or computed. In some embodiments, the parsed information retrieved and/or a buffering level can be defined by one or more of, but not limited to, the following structure:

$t_{ai}$: Arrival time of first bits from the access unit;
$t_{af}$: Final arrival time of the last bits from the access unit;
$t_{rn}$: Removal time of the access unit from the buffer;
$t_{on}$: Display time of the access unit;
preBufferLevel: Buffer level at the removal time prior to removal;
ausize: Size of the access unit;
maxBufferLevel: Maximum buffer level found at this removal time;
minBufferLevel: Minimum buffer level found at this removal time;
unboundBufferLevel: Buffer level that is not restricted to the buffer size (buffer level with an infinite buffer size); and/or
other relevant information.

Additional or alternative information can be defined that may be specific, for example, to AVC. Such additional information may include but is not limited to:

isbperiod: Flag indicating if it is a buffering period (GOVU start);
initial_cpb_removal_delay: Pre decoding delay for the particular removal time;
initial_cpb_removal_delay_offset: Pre decoding delay offset for the particular removal time; and/or
calc_initial_cpb_removal_delay: Calculated value of an ideal pre decoding delay for the particular removal time.

Further or alternative information can be defined that may be specific, for example, to MPEG. Such additional information may include but is not limited to:

isgovu: Flag indicating a new GOP;
vbv_delay: Indicate the buffer fullness for each picture in case of CBR; and/or
calc_vbv_delay: Ideal value of the buffer fullness for each picture.

Additional or alternative information can be defined that may be specific, for example, to VC1. Such additional information may include but is not limited to:

isgovu: Flag indicating a new entry point;
hrd_full: Indicate the buffer fullness for each picture; and/or
calc_hdr_full: Ideal value of the buffer fullness for each picture.

For the access units, some embodiments can calculate the value of the buffer fullness that the stream should indicate, e.g., vbv_delay in case of MPEG, hdr_full for VC1 and initial_cpb_removal_delay in case of AVC.

Through the parsing process 922, a vector is generated of information for the access unit (e.g., vector of AVCAUInfo in the case of AVC), N leaky buffering models (where N is the number of leaky buffering models specified in the parsed stream), and for each of those models a corresponding vector of buffering level (e.g., vector of AVCAUbufferLevel in the case of AVC). The information, parameters and/or meta-data identified through parsing can additionally and/or alternatively be use to simulate one or more new buffering models by changing the transmission rate and/or the buffer size parameters for a given bit stream, or when performing a segment re-encode to maintain a valid buffer model.

Utilizing the parameters, information and/or meta-data identified through parsing, one or more leaky buffer models can be simulated allowing the creation of one or more new valid buffer models that can be applied to a particular stream. The simulation 924, in some embodiments, is used in part to change the bit-rate, buffer size and/or the bit-rate mode (e.g., VBR/CBR). For example, simulation in the case of AVC can be described as follows:

```
static bool SimulateAUBuffer(
    , const std::vector<AdvMux::AVCAUInfo>& auBaseList
    , const std::vector<MPEGSystemStreamParser::-
AVCAUbufferLevel>& auBaseBuffer
    , bufferModel& model
    , std::vector<MPEGSystemStreamParser::AVCAUbufferLevel>&
auOutBuffer);
```

Each simulation identifies when one or more buffer thresholds are exceeded, such as overflow thresholds and/or underflow thresholds, and returns the results, such as returning the result of the number of overflows and underflows detected in the bufferModel structure and/or a vector of buffer levels over a stream and/or segment. When a simulation succeeds without overflows or underflows, the stream can be modified based on the new bufferModel passed in above during a stream correction phase as further described below. Some implementations further attempts to improve buffer re-analysis, for example with VC1 and MPEG2, that allow the re-analysis to be halted when newly determined values match values from the base encode. Further in some embodiments, the buffer analysis is simplified by analyzing the information, parameters and/or meta-data and typically does not have to read an entire stream from disk and parse the data.

The correction phase 926, in part, consists in some embodiments of the rewriting of fields in order to correct or replace a leaky buffer model specified in a base encode that is identified as no longer being valid. The stream is altered to conform to a new model that comes from a simulation and/or the merging processing 924 in the case of segment re-encode as described above and further described below. The correction phase performs, in part, a rewrite of one or more fields. For example, with MPEG-2, the correction phase can cause a rewrite of one or more of the following fields:

bit_rate_value and bit_rate_extension: The new value of the bit-rate;

vbv_buffer_size_value and vbv_buffer_size_extension: The new value of the buffer size; and/or vbv_delay: The new value of the buffer fullness of each picture.

Similarly, with VC1 correction phase can cause an additional or alternative rewriting of one or more of the following fields:

hrd_rate[n]: The new value of the bit-rate for this particular leaky buffer model;

hrd_buffer[n]: The new value of the buffer size for this particular leaky buffer model; and/or hrd_full[n]: The new value of the buffer fullness of each picture for this particular leaky buffer model.

Still further with regard to AVC, the correction phase can cause an additional or alternative rewrite of one or more of the following fields:

bit_rate_value_minus1[n]: The new value of the bit-rate for this particular leaky buffer model;

cpb_size_value_minus1[n]: The new value of the buffer size for this particular leaky buffer model;

cbr_flag[n]: The new value of the CBR/VBR flag for this particular leaky buffer model;

initial_cpb_removal_delay[n]: The new value of the decoding delay for this particular leaky buffer model; and/or initial_cpb_removal_delay_offset[n]: The new value of the decoding delay offset for this particular leaky buffer model.

A new value of the initial_cpb_removal_delay can correspond with a preferred or ideal value calc_initial_cpb_removal_delay store in a buffering level vector. The value of calc_initial_cpb_removal_delay can be calculated, according to some implementations, as follows:

calc_initial_cpb_removal_delay=$tg,90_{(n)}$=
90000*$(tr,n_{(n)}-taf_{(n-1)})$, where the constraint for VBR of initial_cpb_removal_delay<=Ceil($\Delta tg,90_{(n)}$) is followed, and/or the constraint for CBR of Floor($\Delta tg,90_{(n)}$)<=initial_cpb_removal_delay<=Ceil($\Delta tg,90_{(n)}$) is followed.

The segment based re-encoding, at least in part, allows the re-encoding of a section of video, for example, to increase the quality of a segment that does not meet visual quality standards. The increased quality can be achieved, for example, by increasing the bit rate of the segment. Segment based re-encoding can additionally and/or alternatively be employed, for example, to reduce the number of bits utilized in a segment to provide extra bits to other segments or sections of the stream. In some embodiments, it is beneficial to determine a maximum bit rate that can be utilized and/or specified by a user for a given segment that can substantially avoid underflows and/or overflows downstream due to the changes. Prior to a segment re-encode, bit-rate boundaries and the buffer fullness boundaries can be determined that result in a legal stream. For example, the boundaries can be determined as follows:

```
static bool bitrateBoundaryAUBuffer(
   const UInt32 segIndex
   , const UInt32 segSize
   , const bufferModel& model
   , const std::vector<AdvMux::AVCAUInfo>& auList
   , const std::vector<MPEGSystemStreamParser::AVCAUbufferLevel>&
   auBuffer
   , double& minimumBitrate
   , double& maximumBitrate
   , double& minimumBufferFullness
   , double& maximumBufferFullness).
```

The minimumBitrate corresponds to a rate in CBR with no overflow; the maximumBitrate corresponds to a rate with no underflow; the minimumBufferFullness corresponds to the target minimum buffer fullness in bits with no underflow; and the maximumBufferFullness corresponds to the target maximum buffer fullness in bits with no overflow.

In some embodiments when calculating a maximum bit rate that can be allowed for a segment re-encode, a buffer model simulation is performed with, for example, an infinitely sized buffer in the case of MPEG-2 and/or VC1, and no constraint arrival time leaky bucket model (CAT-LB) constraint in AVC. Applying these constraints substantially eliminates bit-rate zeroed flat sections in the buffer level graphs, and the buffer levels are unbounded by buffer size or CAT-LB constraints. The value of unboundedBufferLevel in the buffer level structure corresponds to this unbound buffer level. A search can then be performed for the minimum "unbounded" buffer level resulting from this buffer model simulation starting from the first picture after the end of a segment re-encode and ending with the end of stream or other ending point (e.g., in some instances, the end point can be at a flat section 1126). The unbounded level is referred to below as unboundedBufferLevelb$_{(Min)}$. Additionally, a maximum of unboundBufferLevel can be determined considering values starting from the first picture after the re-encode segment and ending with the end of the stream or other end point, where this value is referred to below as unboundBufferLevelb$_{(Max)}$. Based at least in part on the unboundedBufferLevelb$_{(Min)}$ and unboundBufferLevelb$_{(Max)}$, a change in minimum and maximum levels can be determined, for example, as follows:

DeltaLevelMin=(unboundBufferLevelb$_{(Min)}$−unboundBufferLevel$_{(n)}$+preBufferLevel$_{(n)}$); and/or DeltaLevelMax=max((unboundBufferLevelb$_{(Max)}$−unboundBufferLevel$_{(n)}$+preBufferLevel$_{(n)}$),$B$), where unboundBufferLevel$_{(n)}$ is the value of the unboundBufferLevel of the first picture to re-encode and preBufferLevel$_{(n)}$ is the value of the preBufferLevel of the first picture to re-encode. With R representing an actual rate of the stream, B representing a size of the buffer and segLen representing the length in seconds of the segment to re-encode, a maximum bit-rate can be calculated in some implementations as follows:

maxBitrate=$R$+DeltaLevelMin/segLen.

The minimum buffer level can be determined by subtracting the DeltaLevelMin value from the buffer fullness, after removal of the last picture of the base encode (with the value clipped to >=0). This effectively results in a shifting in an amount of buffer availability and effectively shifts the graph (e.g., graph 1020) down by about the minimum buffer level in attempts to avoid an underflow of the buffer. Similarly, the minimum bit-rate in CBR can correspond to minBitrate=R−DeltaLevelMax/segLen and in some instances is zero (0) for VBR. A maximum buffer level in CBR can be defined as the addition of (B−unboundBufferLevelb$_{(Max)}$) with the buffer fullness, after removal of the last picture of the base encode (with the value clipped to >=0). This effectively shifts the graph up by an amount in attempts to avoid an overflow of the buffer.

In some implementations, following a segment re-encode, merging 924 is performed that merges the buffer level and the access unit information from the base encode with the re-encoded segment encode data. The merging at least in part attempts to keep the buffer model valid during and/or following the re-encoded segment. An example of a merging process for at least AVC can be described as follow:

```
static bool MergeAUBuffer(
    const UInt32 mergeIndex
    , const std::vector<AdvMux::AVCAUInfo>& auBaseList
    , const std::vector<MPEGSystemStreamParser::-
AVCAUbufferLevel>& auBaseBuffer
    , const std::vector<AdvMux::AVCAUInfo>& auSegList
    , const std::vector<MPEGSystemStreamParser::-
AVCAUbufferModel>& auSegBuffer
    , bufferModel& model
    , std::vector<AdvMux::AVCAUInfo>& auOutList
    , std::vector<MPEGSystemStreamParser::AVCAUbufferModel>&
auOutBuffer)
```

Where the arguments can be defined as follow:
  mergeIndex: Merging index;
  auBaseList: Base list of access unit information;
  auBaseBuffer: Base list of buffer level;
  auSegList: Segment list of access unit information;
  auSegBuffer: Segment list of buffer level;
  model: Buffer model in used;
  auOutList: Output list of access unit information; and
  auOutBuffer: Output list of buffer level.

The merging process returns a resulting number of overflows and/or underflows. The output values generated by the merging process can be subsequently used as a new base encode for the subsequent segment re-encode. If a merge succeeds with no overflows and no underflows, the stream buffer fullness information can be used during a correction phase 926 to correct the stream.

The merging process is performed, in some implementations, for each segment re-encode for each leaky buffer model present in a stream, which is not necessarily unique in the case of AVC and VC1. In instances where there are multiple leaky buffer models present in the stream, it is possible that one or more models can be invalidated, for example, due to the presence of underflow or overflow. In some embodiments, an invalid model is designated as invalid and/or replaced by a buffer model that is known to be valid for the stream. For example, the buffer vector and/or other parameters or meta-data (e.g., buffer size, bit rate, buffer fullness, and/or other data) for the failed model can be replaced by parameters and/or meta-data of a valid model. Additionally and/or alternatively, as described above, one or more invalid buffer models can be altered so that the model can be validated. The altering of the model maintains the model within give specifications (e.g., high definition DVD (HD-DVD), Blu-ray disc (BD), and/or other specification) but alters the model from initially defined parameters (e.g., user specified parameters, such as parameters to account for multiplexing of streams). The altering of the models can, in some instances, reduce the number of re-encodes that are performed while still meeting the altered buffer model.

Some embodiments further allow dummy or place holder buffer models that allow for performing post analysis and providing more valid models. The models can be built or specified later based on the parsing that was performed during the base encode and/or segment re-encodes. This allows substantially any number of models to be defined that can replace the place holder models.

Further, some embodiments perform a preprocessing that identifies prior to a segment re-encode an amount of additional buffer availability that can be utilized by effectively utilizing a margin above an underflow and/or a margin below an overflow. Referring again to FIG. 10, as the buffer cycles through a filling and releasing of bits, the fill level approaches a lower or zero level 1040. The smallest distance 1042 between the fill level and the minimum buffer level can be identified, in some implementations, as a margin of buffer availability. As introduced above, some embodiments provide for a shifting in an amount of buffer availability and effectively shifts the graph down by about the margin of availability in attempts to provide increased buffer utilization while avoiding an underflow and/or overflow of the buffer. In utilizing the minimum margin, underflows typically are avoided. Some embodiments perform a further or subsequent simulation to determine whether the shift causes any under or overflows.

Similar use of available buffer margins can be employed with variable bit rate (VBR) encoding. Referring to FIG. 11, again the minimum margin between the fill level and the lower or zero levels can be identified. With VBR, however, following a shift, once the fill level reaches the maximum fill 1126 and stops accepting bits, the shift is effectively eliminated, and the buffer model continues as if there was no shift. As such, some embodiments allow multiple shifts along the stream and the minimum margin is determined between maximum fill levels (e.g., flat areas 1126). The amount of available buffer shift is determined, in some embodiments, through the simulation process 924. In some implementations, the determination of available shift is implemented prior to performing segment re-encodes to more fully utilize the buffer. The simulations can be performed for each of the buffer models when more than one model is identified.

As introduced above, some embodiments allow a user to control the encoding and/or re-encode, providing the user with greater control over the encoding process and greater satisfaction of the encoded end product. For example, the system can identify one or more segments that fail a model, identify a plurality of possible P- and/or B-pictures to the user from which to select where a new I-frame is to be generated and/or other such feedback and information. The user can then select which frame is to be converted, which segment(s) to re-encode or perform other functions.

Figure 12:
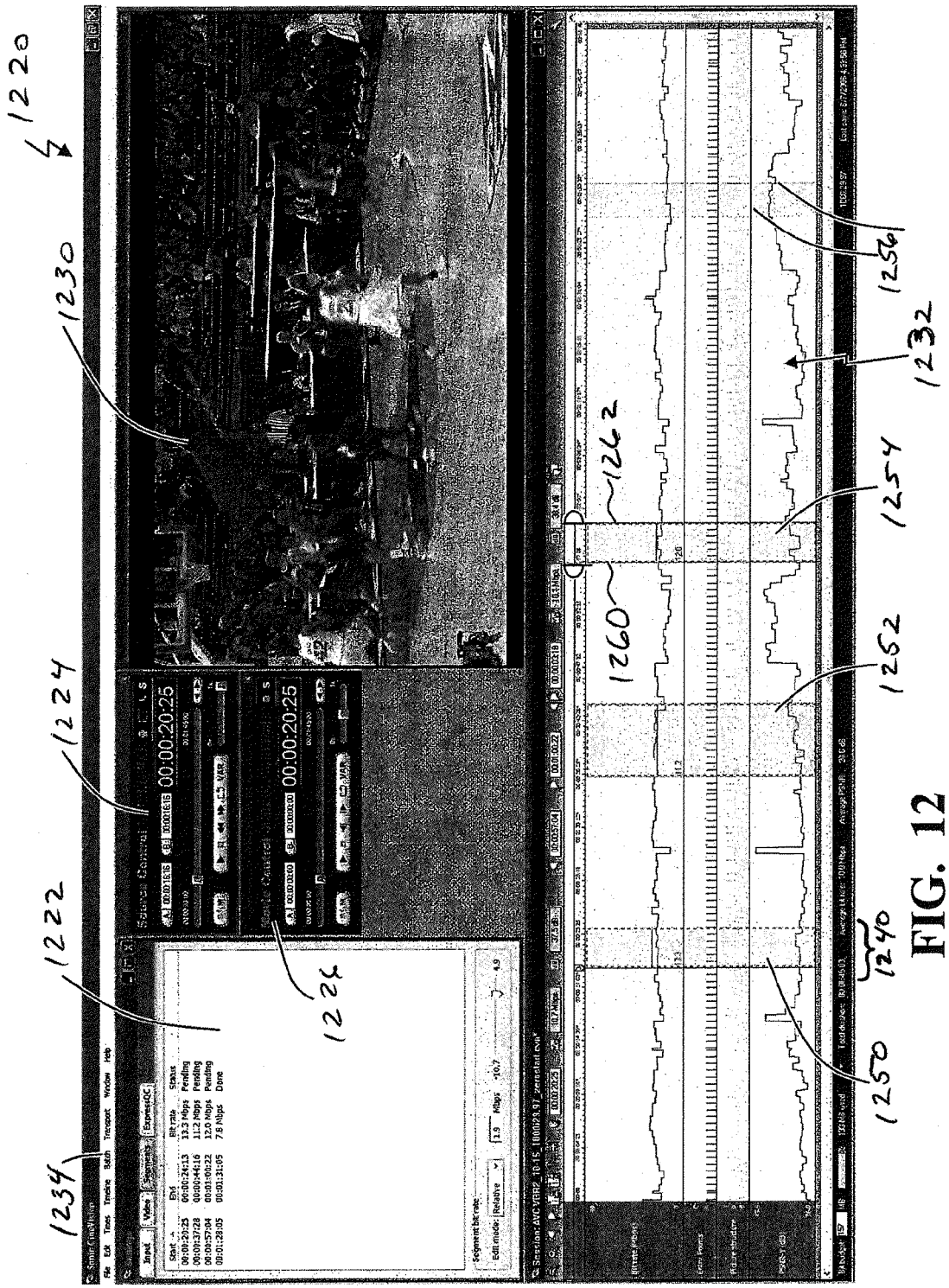
FIG. 12 shows a graphical user interface according to some embodiments allowing a user to encode content, review encoded content and/or to implement and control the re-encoding of one or more segments.

FIG. 12 shows a graphical user interface 1220 according to some embodiments that facilitates and/or allows a user to encode content, review encoded content and/or to implement and control re-encoding of one or more segments. The user interface can be generated through a computer or other relevant devices, and in some embodiments the encoding system 124 is implemented through a computer that also generates and displays the user interface 1220. The user interface 1220 includes a settings window 1222, a source code control window 1224, a playback or movie control window 1226, a preview window 1230, a timeline window 1232, and a user interface tool bar 1234. In some implementations, the timeline window 1232 is not depicted within the user interface 1220 until the content being evaluated has been encoded through a base or initial encoding. The timeline window can further identify one or more segments 1250, 1252, 1254, 1254 that have been highlighted, selected, identified to be re-encoded and/or re-encoded as further described below.

Figure 13:
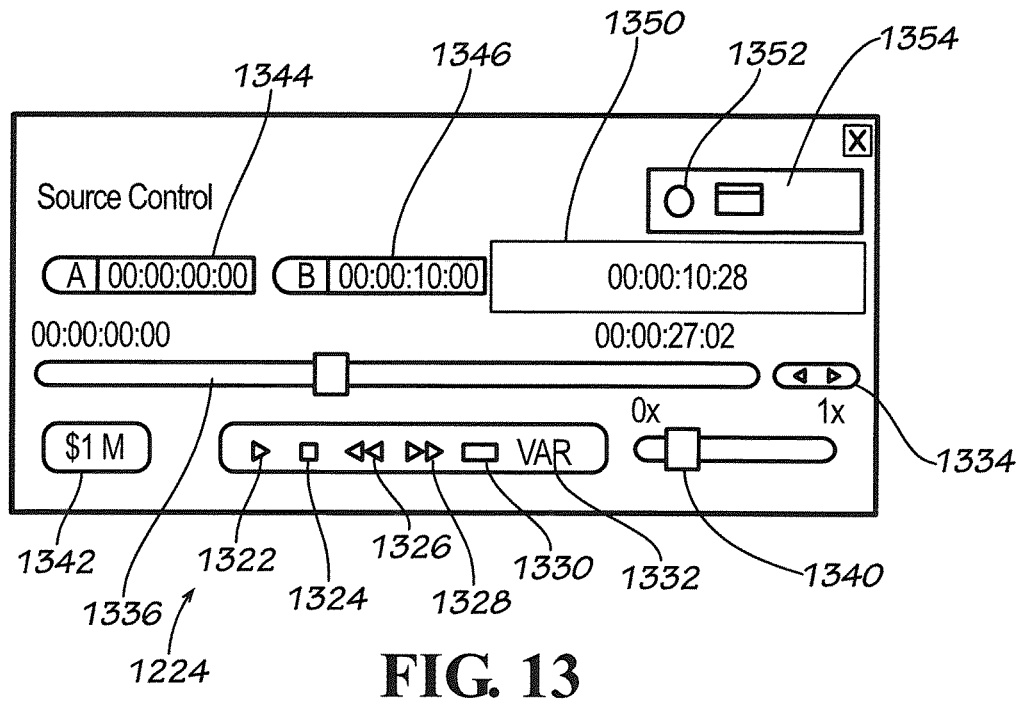
FIG. 13 depicts a simplified graphical representation of the source code control window.

FIG. 13 depicts a simplified graphical representation of the source code control window 1224. The source code control window allows a user to define and access a source of content to be encoded and can be accessed and selections made using a keyboard, a mouse, stylists, remote control or other pointing device and/or other such methods. Further, the source control window includes several options, keys and/or buttons such as play 1322, stop 1324, rewind 1326, fast forward 1328, loop play 1330, variable speed playback 1332, nudge previous and/or next entry point 1334 and/or other such buttons; a shuttle control bar 1336; a variable speed control drag bar 1340; a monitor control 1342; location A indicator 1344; location B indicator 1346; timecode display 1350; indicators such as frame drop 1352, synch mode 1354 and other such indicators; and/or other options, features and/or buttons. Using the source control window a user can in part find start and end points for material to be encoded.

The shuttle control 1336 shuttles back and forth to nearby locations. The further left (e.g., representing back) or right (e.g., representing forward) the shuttle control is dragged, the faster it locates, and can be effectively biased to return to a predefined point, such as the center when released. The nudge buttons 1334 allow navigation through the content one entry point at a time. The "locate A" 1344 stores and recalls a timecode location for the source material and "locate B" 1348 stores and recalls a timecode location for the source material. The timecode display 1348 shows the current timecode location for the source material. The sync status 1354 indicates whether sync mode is enabled allowing the movie control window 1226 to stay in sync with playback from the source control window 1224. The frame drop 1352 indicates when frames are dropped during source playback. The monitor control 1342 toggles which transport is the active one (source control window 1224 or movie control window 1226).

Figure 14:
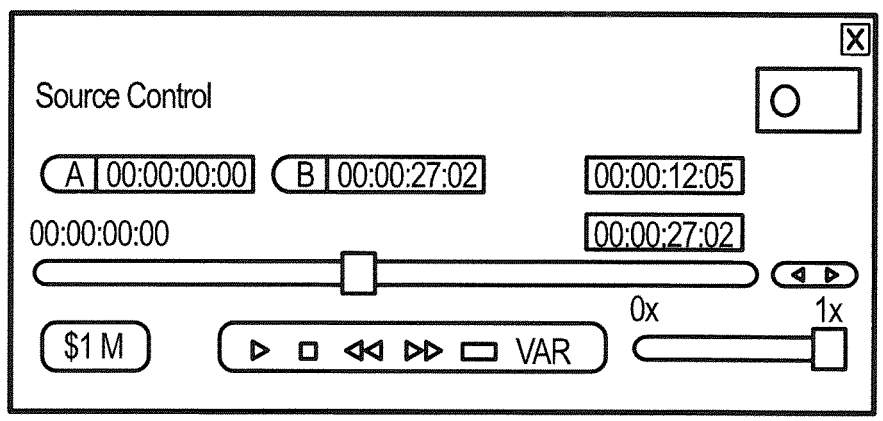
FIG. 14 depicts a simplified graphical representation of the movie control window.

FIG. 14 depicts a simplified graphical representation of the movie control window 1226. The movie control window allows a user to preview encoded content and can be accessed and selections made using a keyboard, a mouse, stylists, remote control or other pointing device and/or other such methods. Further, the movie control window includes several buttons, indicators, control bars, time display and the like, and in some implementations these buttons, indicators and the like are similar to those of the source control window 1224.

Figure 15:
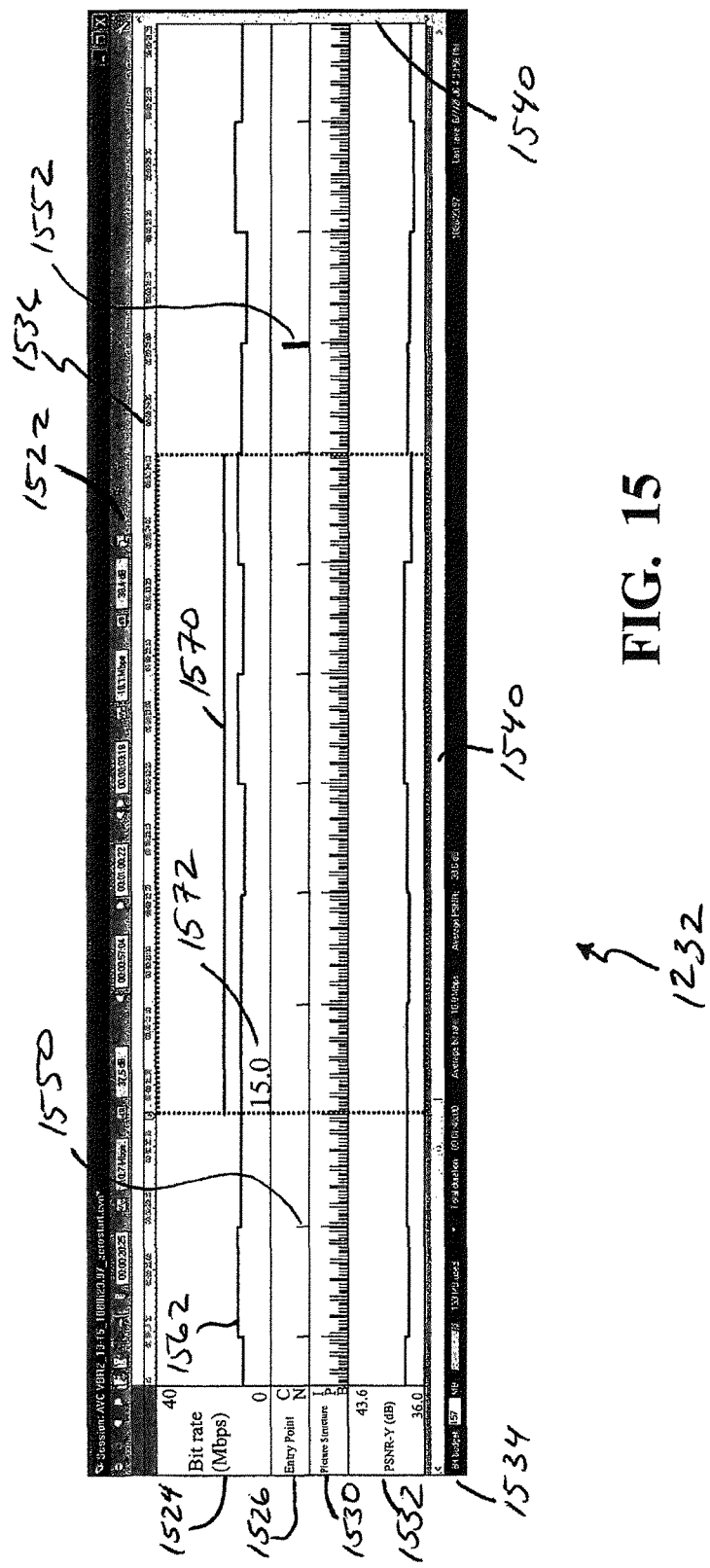
FIG. 15 shows a simplified graphical representation of the timeline window according to some embodiments.

FIG. 15 shows a simplified graphical representation of the timeline window 1232 according to some embodiments. The timeline window includes a tool bar 1522, a bit rate track 1524, an entry points track 1526, a picture structure track 1530, a quality track 1532 such as a signal to noise ratio (PSNR) track, a status bar 1534, time markers 1536, one or more scroll bars 1540 and other relevant fields or areas. The timeline tool bar 1522 at least in part allows a user to navigate content and mark segments, and the status bar 1534 displays information about the session. Typically, the bit rate track 1524, entry point track 1526, picture structure track 1530 and quality track 1532 are cooperated and/or coordinated such that entries within each track correspond with entries in one or more of the other tracks. For example, some embodiments configure the tracks such that entry point track 1526, picture structure track 1530 and quality track 1532 correspond with the bit rate track 1524.

The timeline window 1232 includes tracks that display the content bit rate 1524, entry points 1526, picture structure 1530, and a measure of quality 1532. Individual tracks can be set to their own height and they can be hidden. In some embodiment, the timeline and/or track data can be zoomed to provide greater resolution. The bit rate track 1524 displays a plot of the bit rate for the video encoded content. In some instances, when the content is encoded with CBR the graph is generally level or a straight line, while when encoded with VBR the graph varies over time as the bit rate varies, for example with each GOP. The minimum and maximum values for the plot differ depending on the encoder, target application (e.g., HD-DVD, Blu-ray or the like) and/or other such factors.

The entry points track 1526 displays the entry points in the content as vertical lines. Multiple types of entry points can be defined, and in some embodiments, at least two types of entry points can be displayed: "normal" (N) 1550 and "custom" (C) 1552, where the custom points can be user defined points, such as chapter points and/or other points where re-encodes are to be initiated or terminated. In many instances, the custom entry points 1552 are specified in a list before the encode. In some embodiments, when the timeline 1232 is zoomed in, numbers for the custom entry points 1552 are also displayed. The entry points define valid locations when scrubbing the playhead, setting segment re-encode in-points and out-points, locations for chapter points (e.g., when authoring HD-DVD content, Blu-ray content and/or other relevant content). Further, the entry points show in some instances GOP header points, for example with MPEG showing where the I-frames are along the content stream, points where chapter point can be defined and/or other points, for example, where start points for a re-encodes may be defined. The normal identifiers 1550, in some instances, can identify where scene changes occur. In some embodiments, the re-encoding reconfigures frame structures allowing for the generation of a new I-frame and/or the conversion of a B or P-frame to and I frame. The entry points track 1526 can, in some implementations, further identify those new and/or converted I-frames.

The picture structure track 1530 can display, in some implementations, individual picture types in each GOP, for example, with vertical lines distinguished by varying line heights (e.g., I-frames, tall lines; P-frames, medium lines; B-frames, short lines).

The timeline 1232 can further show the quality measure track 1532 that in some implementations is PSNR track depicting a peak signal-to-noise ratio data. In some embodiments the PSNR track is a PSNR-Y track based on luminance (Y). PSNR can be used to determine a quality of an encode, and can be determined in some embodiments by comparing luminance intensities across the encoded image with those in the source content, or other signal-to-noise ratio calculations. Typically, the PSNR track 1532 shows the PSNR for each GOP and/or frame of the encoded content. The PSNR values can aid a user in identifying one or more GOPs and/or frames that may not meet desired encoding results and/or picture quality, and segments to be re-encoded.

Figure 16:
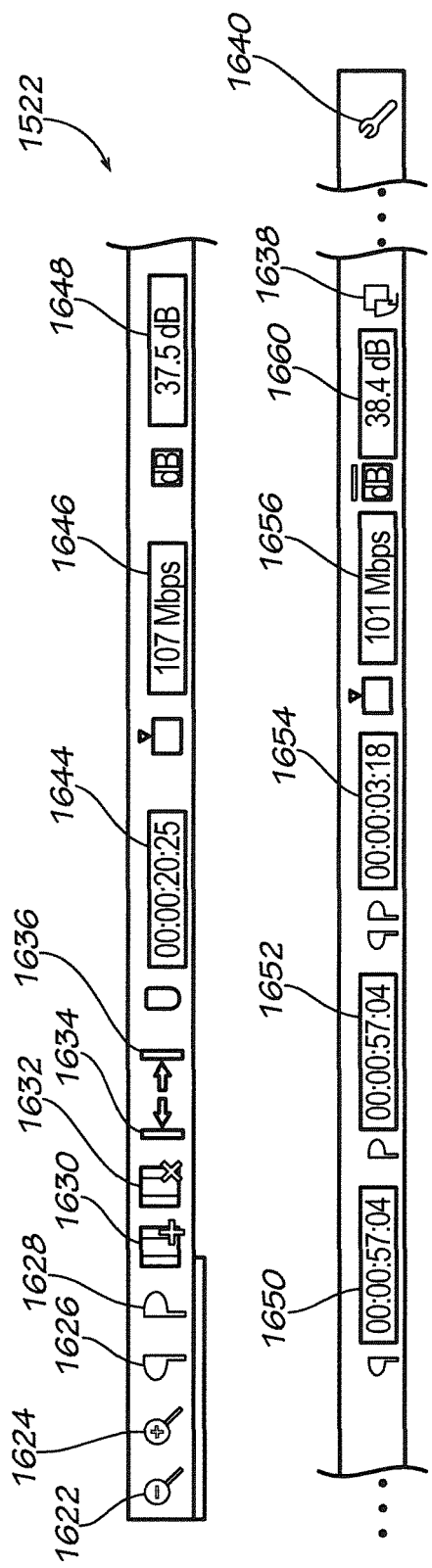
FIG. 16 depicts a simplified graphical representation of an enlarged view of the timeline toolbar.

FIG. 16 depicts a simplified graphical representation of an enlarged view of the timeline toolbar 1522. The toolbar includes a number of different tools or features that can include a number of options, buttons, toggle switches, text and/or numeric fields, indicators, parameter information and/or substantially any other relevant tools. In some embodiments, the timeline toolbar 1522 includes zoom-in and zoom-out tools 1622 and 1624, respectively; setting "in-points" tool 1626 and "out-points" tool 1628; marking segments option 1630; clear segment option 1632; previous segment option 1634; next segment option 1636; adding the session to a batch encode options 1638; opening the timeline display options dialog box tool 1640; and/or other relevant options and tools. The timeline toolbar 1522 also includes fields such as playhead location field 1644, playhead bit rate field 1646, playhead PSNR field 1648, in-point and out-point location fields 1650, 1652, segment duration field 1654, segment bit rate field 1656, segment PSNR field 1660 and/or other relevant fields.

Figure 17:
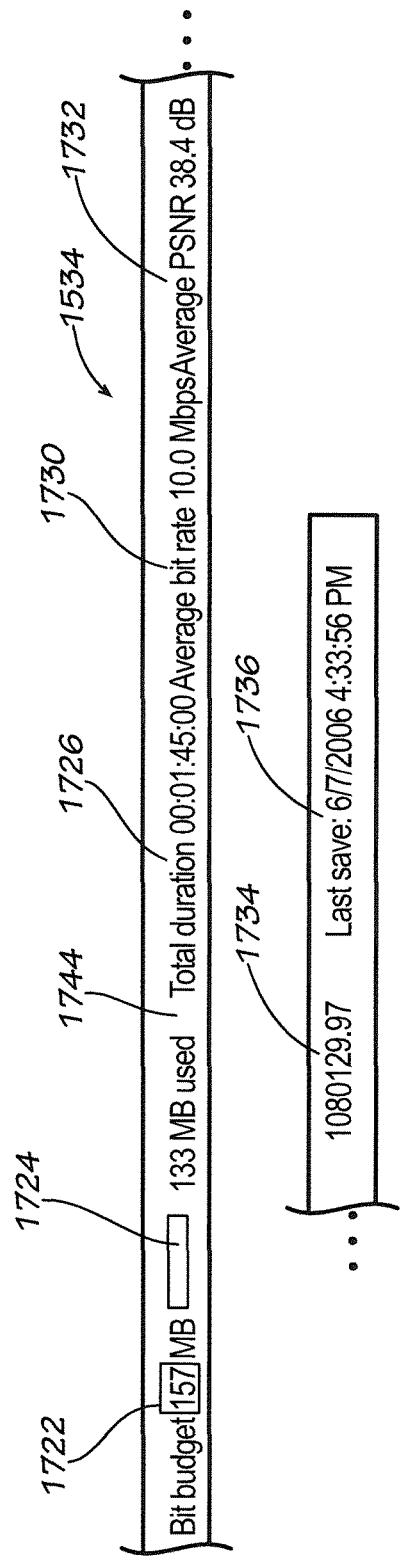
FIG. 17 depicts a simplified graphical representation of an enlarged view of the status bar.

FIG. 17 depicts a simplified graphical representation of an enlarged view of the status bar 1534. The status bar includes a plurality of fields providing additional information and statistics to the user. In some embodiments, the status bar 1534 includes a bit budget field 1722, bit budget meter and field 1724, total duration field 1726, average bit rate field 1730, average PSNR field 1732, video standard field 1734, a last save field 1736, and/or other such fields.

The bit budget field 1722 provides a target capacity, for example, of video material in the content, and can include encoded content and other content or material that is to be re-encoded. A user can enter a value directly into the field 1722. Additionally or alternatively, the field can be automatically filled based on a default value that is equal to a size of the encoded content plus a defined headroom specified in a default headroom option, which can be accessed in some embodiments through the user interface toolbar 1234. For example, when the encoded content is 130 MB and the default headroom option is set to 20%, the default bit budget is approximately set at 157 MB (i.e., 130*1.2). In some embodiments, a maximum value that can be entered directly into the bit budget field 1722 is determined by a target application (e.g., 30,000 MB for HD DVD-Video; 50,000 MB for Blue-ray; and other such maximums based on target applications).

The bit budget meter field 1724 displays a session's or project's remaining and used space. Some implementations include a pull down or toggle switch 1744 that can be selected or clicked with a selection device, such as those described above or other such selection device, to toggle between a remaining and used space. The capacity for the session is displayed in the bit budget field 1722. The used space is calculated, in some embodiments, by adding the size of the encoded material plus segment re-encodes that are pending. In some embodiments, when a bit rate for a selected segment is changed, the bit budge field 1722 can be adjusted to show the user how much extra data will be used and/or needed if the re-encode were to be performed. Further, some embodiments provide an options menu that can be activated to allow a user to specify an amount of headroom that is to be maintained for the bit budget for re-encodes. In some instances, the bit budget is defined as a percentage in excess of the base budget.

The total duration field 1726 displays an entire duration in hours, minutes, seconds, and frames of the content. The average bit rate field 1730 displays the average bit rate for the content stream, and in some instances, when one or more segments are pending re-encode (e.g., selected for re-encoding but have not yet been re-encoded), the determination of the average bit rate is based on the bit rate values from the pending segments initial encode (e.g., not the selected pending re-encoded bit rate).

The average PSNR field 1732 displays an average PSNR value for the entire content. In some embodiments, the PSNR is a luminance PSNR and the average PSNR displays an average luminance PSNR value for the entire content stream; however, other signal to noise ratio values can be used and/or define portions of the content (e.g., average PSNR for a segment or other such portions). The values identified in the average bit rate field 1730 and average PSNR field 1732 can be based on current averages of a selected or highlighted segment, which typically differs from the values specified in the segments tab window listing when the bit rate for the selected segment has been changed. The video standard field 1734 displays the vertical resolution, scan mode, and frame rate for the content stream, and the last save field 1736 displays the date and time when the session was last saved.

The preview window 1230 of the user interface 1220 of FIG. 12 displays the content images and can be the source content or the encoded content. Once a re-encode is performed, a user can select a headend point (e.g., using a point or the like) prior to the re-encoded segment and activate a playback so that the re-encoded segment is played back in the preview window 1230. In some embodiments as described above and further below, the data of the re-encoded segment is stored in a separate file than the base encoded file and upon playing back of the re-encoded segment, the separate file is accessed for playback. Further, the user can activate the preview window to be full screen or substantially any desired size. In some implementations, the preview window can be displayed on a separate display or monitor allowing a larger or full screen view while still allowing the user to utilize the other windows of the user interface 1220.

FIGS. 18-21 depict various options within the settings window 1222. More specifically, the settings window includes one or more tabs or other selection buttons 1822 that allow a user to access the various options available through the settings window. In some embodiments, the tabs 1822 can include an inputs tab 1824, a video tab 1826, a segments tab 1828, an express or expressQC tab 1830, and/or other such tabs.

The input tab when selected prior to encoding access an input settings window that allows a user to access and adjust settings and parameters and to view statistics defining some of the parameters settings following a base encode of the content. The video source can consist of single video files, an image sequence folder and/or other relevant sources. Information about the source material is displayed in a settings summary box. Before the encode, the input tab settings window has an edit settings button that opens an input file settings dialog box, where a user can configure settings for the video source material. In some embodiments, the input settings window allows the setting of a video source type (e.g., setting the source type to one of a file, multiple video frame files (an image sequence), and/or other source types); add media where parameter fields can be updated with values read from the media file and specify values for any parameters not determined from the media, where a pixel format specifies a data structure of the RGB or YUV video samples; specify source start timecode; repeating a previous step to add additional media files; removing one or more media files; browse to a different source; and/or other settings or parameters.

Figure 18:
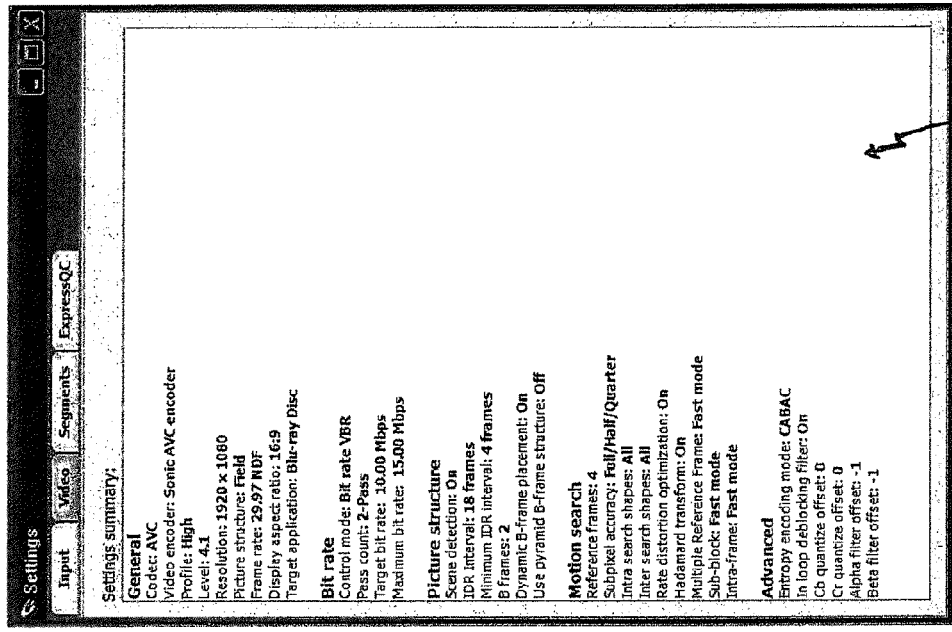
FIG. 18 shows the settings window with the input tab settings window displayed following a base encode.

FIG. 18 shows the settings window 1222 with the input tab settings window 1820 displayed following a base encode. The input tab window displays a summary of the parameters actually used during the base encode. For example, the input tab window may show the source file 1840, and parameters of the source file and/or parameters used during encoding, such as resolution, scan mode, timecoder, pixel format and substantially any other relevant parameter.

The video tab 1826 activates a video tab settings window 1920 allowing a user to access settings for the video encoding parameters. Before an encoding, the video tab settings window can include a settings pop-up menu for recalling video presets and default settings. The settings pop-up menu also can contain an edit command that opens a video settings dialog box, where the video encoding parameters can be configured and saved.

Figure 19:
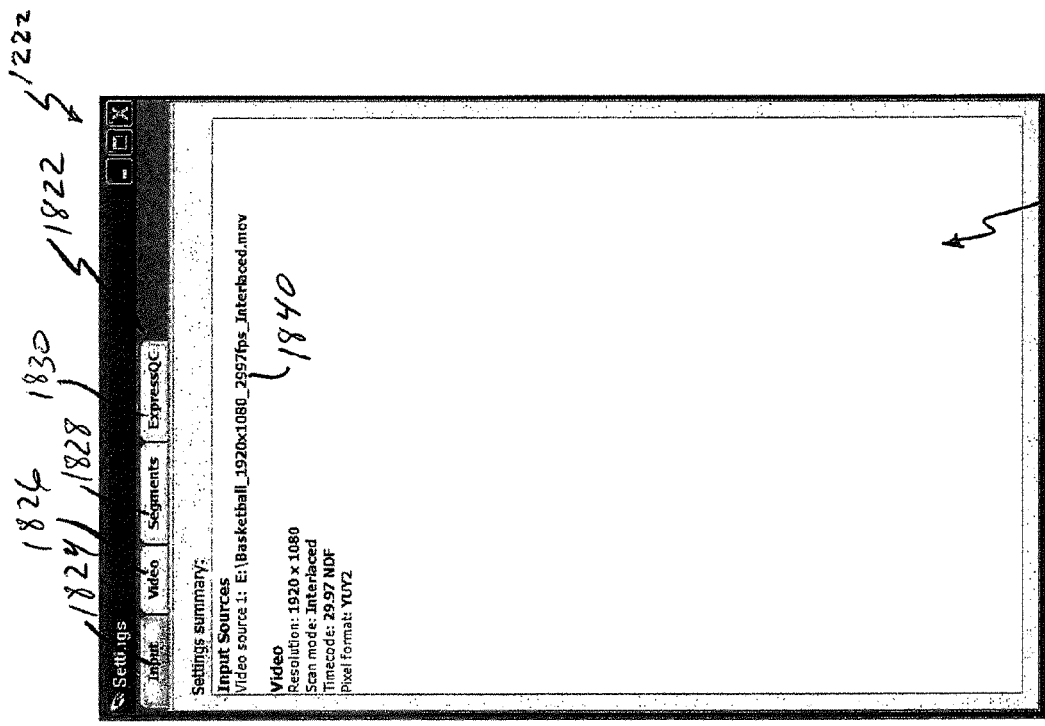
FIG. 19 depicts the settings window with the video tab settings window displayed following a base encode.

FIG. 19 depicts the settings window 1222 with the video tab settings window 1920 displayed following a base encode. Following an encode, the video tab window shows parameters utilized during encoding, such as codec, encoder, profile, level, resolution, picture structure, frame rate, display aspect ratio, target application, bit rate parameters, control mode, pass count, target bit rate, maximum bit rate, picture structure, scene detection, IDR interval, minimum IDR interval, B frames, dynamic B-frame placement, use pyramid B-frame structure, motion search, number reference frames, subpixel accuracy, intra search shapes, inter search shapes, rate distortion optimization, hadamard transform, multiple reference frame, sub-block, intra-frame, entrop encoding mode, in loop deblocking filter flag, Cb quantize offset, Cr quantize offset, alpha filter offset, beta filter offset, other parameters for other encoding schemes (e.g., MPEG2, AVC, VC1 and/or other such schemes) and substantially any other relevant parameters.

Figures 20, 21:
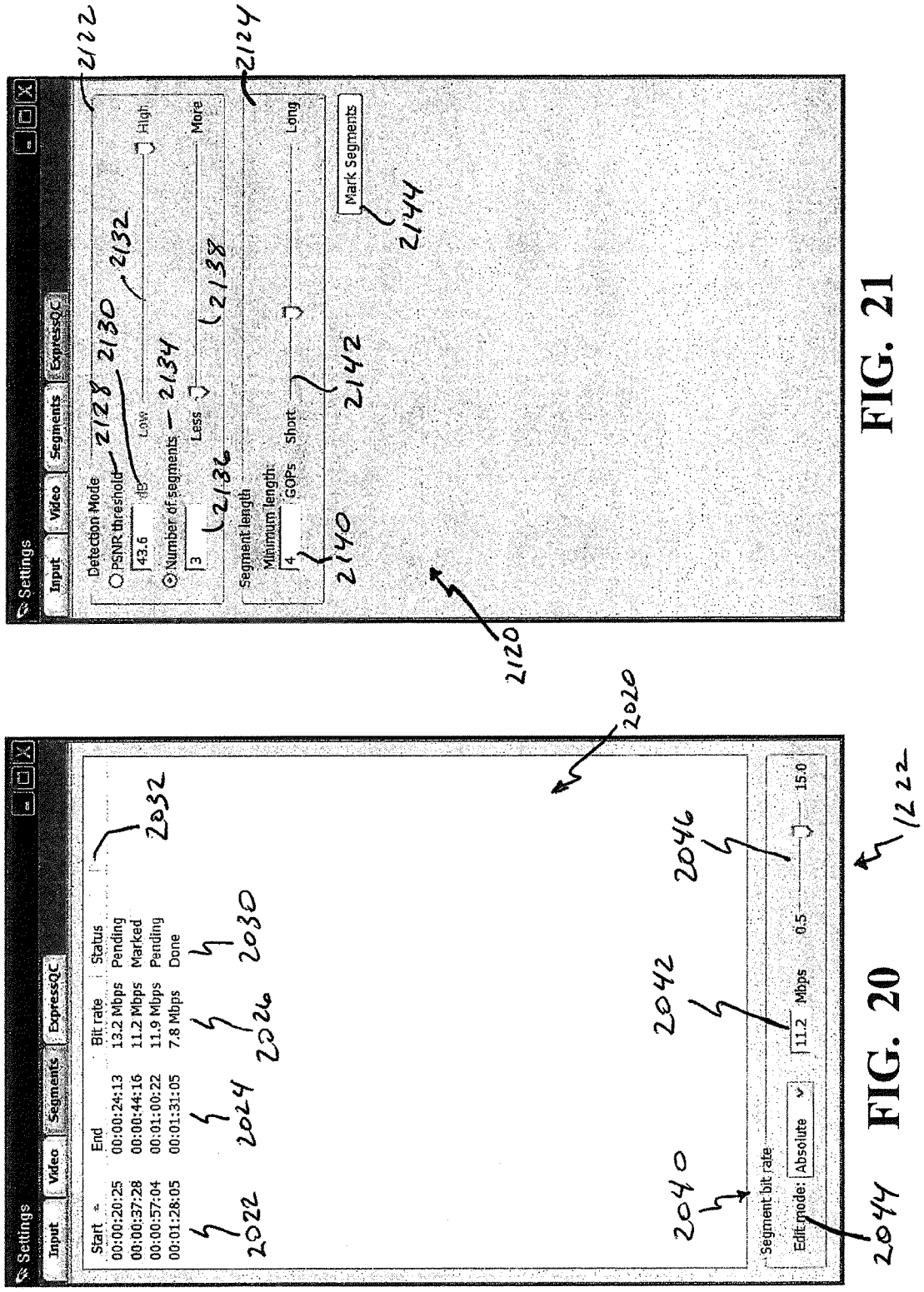
FIG. 20 depicts the settings window with the segments tab settings window displayed.
FIG. 21 depicts the settings window with the expressQC tab settings window displayed.

FIG. 20 depicts the settings window 1222 with the segments tab settings window 2020 displayed. The segments tab settings window displays information about selected, highlighted, and/or re-encoded segments of the session and can include controls for setting bit rates for one or more re-encodes for selected segments. In some embodiments, the selected segments are identified by start and end points 2022 and 2024 (typically listed as a time relative to the timeline of the content). Further, the segments tab settings window can specify a new re-encode bit rate 2026 for each segment, and a status 2030 of the segment (e.g., "marked" identifying a segment highlighted but where the bit rate has yet to be set or altered; "pending" being a selected segment with a bit rate changed and not yet re-encoded; "done" being a segment that has been re-encoded according to the altered bit rate and/or other such identifiers). The segments can be sorted by clicking the column heads 2032 and the columns can be resized by dragging the column dividers.

In some embodiments, the segments tab settings window 2020 includes a segment bit rate area 2040 that allows a user to enter a bit rate value in a bit rate value field 2042. The bit rate value can further be quantified by an edit mode 2044 defined as an "absolute" segment, relative segment, and/or other such definition. In some implementations, the absolute segments can be re-encoded at an absolute bit rate as specified in the bit rate value field 2042. When editing multiple segments at an absolute bit rate, the new bit rates typically are substantially the same for each of the segments. The relative segments can be re-encoded at a relative bit rate, where the existing bit rate is increased by a value specified in the bit rate value field 2042. For example, if three segments with bit rates of 4.0, 4.5, and 5.1 Mbps are re-encoded with a relative bit rate of +1.5 Mbps, the new bit rates will be 5.5, 6.0, and 6.6 Mbps, respectively. Additionally or alternatively, a user can use the bit rate drag bar 2046 with the bit rate value in the bit rate value field 2042 changing as the bar is dragged. In some implementations, a maximum and minimum bit rate values can be displayed, that are representative of maximum and minimum values available according to a decoder model (typically previously set), maximum and minimum values of the base encode or other relevant maximum and minimum values. Once the adjusted bit rate for the re-encode is selected (e.g., by entering it directly into the bit rate field 2042, by adjusting the bit rate drag bar 2046, moving an average bit rate indicator on the timeline 1232 and/or other such entries), the bit rate for the re-encode is reflected in the bit rate column 2026 and the status for the selected segments changes, for example, to pending. In some embodiments, pending segments are identified or distinguished in the timeline window 1232 by a highlighting, a different color or the like, and in some instances show the pending bit rate in the timeline window.

FIG. 21 depicts the settings window 1222 with the expressQC tab settings window 2120 displayed. The expressQC tab settings window is available at least after an encode and provides controls that can be use to select segments for re-encoding, for example, based on a quality measure, such as PSNR statistics. In some embodiments, the expressQC tab settings window 2120 includes detection mode parameters 2122 and segment length parameters 2124. The detection mode parameters can include a PSNR threshold option 2128, threshold level field 2130 and/or threshold level drag bar 2132; and/or a number of segments option 2134, a number of segments threshold field 2136 and/or number of segments drag bar 2138.

The segment length parameters can include a minimum GOPs length field 2140 and a GOPs length drag bar 2142. A mark segment option or button 2144 is further included to initiate a search or evaluation of the content and to mark one or more segments throughout the content or selected portion of the content that have a defined relationship with respect to the thresholds and/or levels specified by the detection mode parameters 2122 and/or segment length parameters 2124. For example, when identifying segments with PSNR levels below a threshold, these segments are quickly located and highlighted on the timeline window 1232 (e.g., see FIG. 12 showing three segments 1250, 1252, and 1254 selected). The user interface 1220 further allows a user to unselect one or more segments marked through the automated process using the expressQC parameters and/or thresholds.

Additionally or alternatively, the timeline 1232 can be used to select and/or define selected segments. In some embodiments, a user positions or drags an indicator to identify one or more areas of the encoded content. Referring to FIGS. 12, 15-16 and 20-21, a user can select one or more segments that include the unsatisfactory portion using the in-point tool 1626 and out-point tool 1628 to position an in-marker or identifier 1260 and out-identifier 1262 bounding a segment 1254 of interest. A user can place the identifiers by dragging the identifiers to the desired locations. In some embodiments, the precise placement of the identifiers can be adjusted by the system relative to a positioning selected by the user. The adjustment can be based on an evaluation of the segment(s) within the selected region bounded between the in- and out-identifiers and/or the content downstream. The adjustment to the in- and out-points to define start and stop points for the re-encode is further described below and can be adjusted based on many factors including a determination of appropriate re-encode start and stop points, dependency between frames and other such factors.

In some implementations, a currently selected segment(s) bounded by the in- and out-identifiers 1260, 1262 is highlighted with a first highlighting (e.g., different color, cross-hatching, dashed lines, brightness and/or other such distinguishing characteristics). Other segments can be identified with alternate highlighting, for example, those segments that have already been re-encoded, for example fourth segment 1256, can be identified with a secondary highlighting (e.g., secondary color), marked segments can have a third highlighting (e.g., third color), and/or pending segments can have a fourth highlighting (e.g., fourth color).

As described above, the bit rate graph 1524 showing an average bit rate value for each GOP 1560. The timeline tool bar 1522 also shows the value of the play position average bit rate 1646 at the position of the playhead (e.g., for the identified, highlighted and/or selected GOP). As the playhead is moved, for example using a pointer device such as a mouse to drag the playhead indicator, the value of the bit rate in the play position average bit rate field 1646 changes.

In some embodiments, the timeline further includes a segment bit rate bar 1570 for those segments selected and/or highlighted. The segment bit rate bar or indication initially identifies an average bit rate for the selected segment. Users can utilize the segment bit rate bar 1570 to change the desired average bit rate for the selected segment by dragging the bar (e.g., using a pointer device) to a desired bit rate. Some embodiments further display the selected segment bit rate 1572 associated with the position of the segment bit rate bar 1570 and changes as the bar is moved. Additionally or alternatively as described above, a user can utilize the segment bit rate area 2040 of the segments tab settings window 2020 to enter a bit rate value in a bit rate value field 2042 or the bit rate drag bar 2046.

The user interface 1232 further allows a user to activate a re-encode of one or more pending and/or marked segments. In some embodiments, multiple segments can be selected at a time. Upon activation of a segment re-encode a progress window may appear notifying the user of the progress of the re-encode. In instances where a user attempts to alter the bit rate beyond a limit that will cause an underflow or overflow of the buffer, an error or warning indicator can be displayed. In some instances, this warning indicator is generated prior to a re-encode being attempted based on a pre-analysis of the segment, the altered bit rate, the downstream content and/or the buffer model. An error message can be generated in some instances upon attempting a re-encode indicating that the re-encode may result in an overflow or underflow. As introduce above, however, some embodiments further allow for the adjustment and/or compensation for bit rate changes to reduce potential errors by adjusting bit rates and/or buffer levels down stream from the selected segment and/or in neighboring segments to the selected segment.

In some implementations, the user interface 1220 allows a user to adjust the bit rate for a selected segment between the maximum and minimum bit rates set for the model. Some embodiments, however, calculate the maximum and/or minimum available bit rates by analyzing the content and/or metadata downstream from the selected segment that may be available for the re-encode of the selected segment. This provides further feedback to the user regarding what they can actually achieve and whether further re-encodes of neighboring and/or other segments are needed to free up additional bits.

There is substantially no limit as to the number of segments that can be marked and/or selected at a give time. As such, a user can mark multiple segments and make iterative adjustments to the multiple segments to achieve a desired bit rate for a segment with a higher priority. For example, a user can select a first segments 1250 as well as second and third segments 1252, 1254 downstream of the first segment, and make adjustments to the second and third segments to free up bits for the first segment, which can be reflected by an indication of a change in a maximum available bit rate for the first segment as the bit rates for the second and/or third segments are adjusted.

Once the user has completed the desired re-encoding, the user can activate a finalization through the user interface 1220. The finalization merges the segment re-encodes with the base encodes and updates the data of the stream for the buffer levels as fully described above and further below. In some embodiments, the user interface 1220 may include an additional segments edited tab in the settings window 1222 that allow a user to define and/or alter parameters, such as a target bit rate, minimum or floor bit rate, quantization offset of chrominance, in loop deblocking filter or other filtering, buffer size, buffer fullness levels and/or other such relevant parameters. These parameters may vary depending on the specified codec being applied. Additionally and/or alternatively, some embodiments allow a user to select a specific frame, for example through the time line 1232, and defining a change in picture type (e.g., by using a drop down window, dragging it to a picture frame type indicator and/or other such activation), such as promoting a B- or P-frame to an I-frame. This promotion of frame types can be used, for example, for marking a scene change (e.g., when the scene detection system fails to accurately detect a scene change).

The zoom-in option 1622 and zoom-out option 1624 provide zooming capabilities on the timeline tracks. The timeline 1232 depicted in FIG. 15 is a zoomed-in view of the portion of the timeline 1232 labeled by reference numeral 1240 showing greater precision along the portion 1240 of the timeline. This zooming allows a user to view a timeline relative to a large portion or all of the content while additionally providing greater access to more precise data, and further provides a user with more precise control over the identification and/or selection of frames and/or segments, as well as more accurate evaluation of the encoded stream and PSNR data of the PSNR track 1532.

Referring to FIGS. 12 and 15, the GOPs of the portion 1240 are zoomed in and expanded in FIG. 15 (e.g., showing approximately 11 full GOPs in this view). The bit rate track 1524 graphically depicts approximate average bit rates 1562 over each GOP. Further, a user can more accurately identify the normal entry points 1550 and custom entry points 1552 depicted along the entry point track 1526, as well as the picture types depicted along the picture structure track 1530. As described above, a user can select a segment and use the segment bit rate bar 1570 to set a desired bit rate for re-encode.

In implementing the encoding and/or segment re-encoding, some embodiments employ an encoding process and/or encoder system that allows for accelerated encoding rates resulting in reduced processing time. As the amount of data supplied with respect to some content, such as high definition content and/or other content containing large amounts of data, the data rates can be extreme and typically the resulting output quality needs can be very high. Thus, the processing requirements for encoding some content can be great. Some present embodiments provide high quality encoded content at relatively high data rates, such as encoding at about real time rates, by in part temporally breaking or slicing the unencoded content and providing parallel encoding, effectively scaling up processing to achieve a desired encoding rate. The parallel encoding increases the speed at which the content is encoded and/or allows enhanced or more precise encoding without undue additional processing time.

Figure 22:
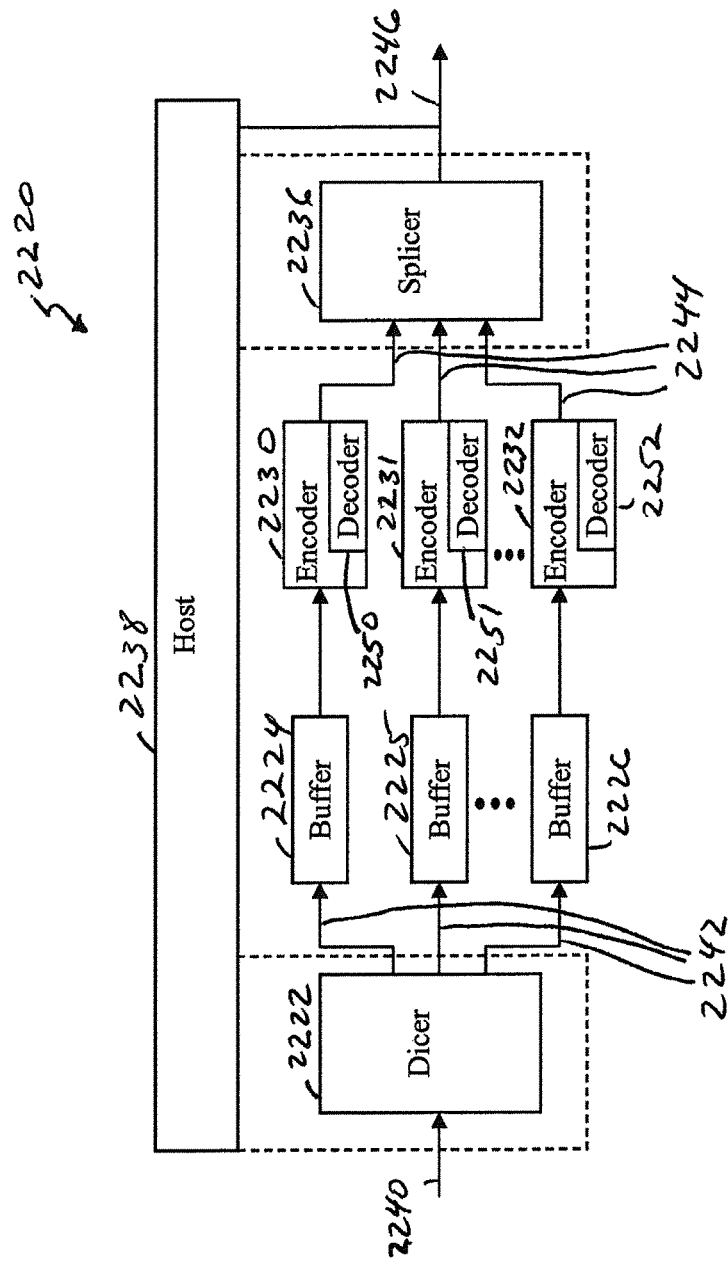
FIG. 22 depicts a simplified block diagram of an encoding system according to some embodiments.

FIG. 22 depicts a simplified block diagram of an encoding system 2220 according to some embodiments. The encoding system includes a dicer or divider 2222, a plurality of dicer buffers 2224-2226, a plurality of encoding processor units 2230-2232, a splicer or concatenator 2236, and a host controller 2238. In operation unencoded content 2240, for example high definition digital content, is supplied to the dicer 2222. The dicer determines how to divide the content, divides the content and forwards the divided segments 2242 to one of the dicer buffers 2224-2226. The dicer can be implemented as hardware, software, firmware and/or a combination, and can be operated in some instances from a computer, such as the host computer.

The divided segments consist of a sequence of frames that are delivered to the encoding processor units 2230-2232 through the buffers and the encoding processor units encode the content. The divided groups of segments can be forwarded to the buffers and/or encoding processor units through firewire connections, hardware specific connections, Ethernet, one or more buses (e.g., peripheral component interconnect, PCI) and/or other connections. The encoding processing units 2230-2232 can be implemented through hardware, software, firmware and/or a combination thereof, which can be implemented on a single processor, single computer, a plurality of processors and/or computers, individual digital signal processor (DSP), arrays of DSPs, and/or other devices or combinations of devices. In some embodiments, the encoding processor units are operated from one or more processors and/or computers with stripped down and/or simplified operating systems reducing processing overhead, improving processing speed and reducing complexity.

The encoded divided segments 2244 are then supplied to the splicer 2236, for example over Ethernet, PCI bus or other relevant communication link(s). The splicer combines the encoded divided segments of content back together into an encoded content stream 2246. Because the content 2240 is divided, each encoder can operate at rates that are less than the rate at which the unencoded content 2240 is being received. As a result, the encoders 2230-2232 can provide accurate encoding at reduced rates and/or enhanced encoding while still accelerating encoding rates, in some implementations approaching and/or achieving real time rates. In some embodiments, the splicer 2236 is implemented in the host computer, in alternative embodiments, however, the splicer can be implemented through independent hardware, one or more separate computers, processors and/or combinations thereof. The encoded segments are stitched back together using, for example, compressed stream concatenation techniques such that the concatenated and encoded stream 2246 is compliant with desired buffer models and/or encoding standards (e.g., AVC, VC1, and other such standards) with relatively minimal and preferably no quality loss.

In dividing or temporally splitting the stream, the dicer generates segments to be encoded that are complete or closed such that each segment does not reference and is not referenced by other pictures outside the segment. As indicated above, the dicer dividing or split points can be determined by available buffer levels, complete picture boundaries (e.g., taking into account film frame to video frame conversion), entry point alignment and/or other relevant factors. The prediction algorithm for "in" and "out" buffer levels can be further utilized to identify potential target slicing points for the segments in attempts to meet buffer models. The spliced encoded stream is typically further evaluated to determine whether the buffer models are achieved, and re-encoding is utilized as described above to satisfy desired models.

In some implementations, the base or initial encoded data 2246 is stored in a first file. One or more additional files can be maintained for storing re-encoded segments. The one or more files or additional files can be utilized to record bit count adjustments, segment quality smoothing, chapter point insertions and/or other encoding adjustments. A mapping or links are recorded and maintained that identify those portions of the initial encoded data that were re-encoded, where chapter points were inserted and other manipulations generated. Additionally, those buffer models for which the encoded content does not comply and/or cannot be met can additionally be recorded. Upon completion of the segment based re-encodes and other adjustments, the final encoded content is written, for example as described above with reference to process 520 of FIG. 5, where the models that are not satisfied are designated (e.g., designated in a header), and the re-encoded segments are retrieved from the one or more additional files to replace the initial encoded segments identified to be re-encoded.

The encoder system 2220 attempts to encode at predefined rates, for example at real time because the production work flow of uncompressed content data (e.g., high definition video) may be received from a source, such as a tape machine, and is being transferred across a data link to the encoder system as a whole in real time, where the system may not be able to stop the data flow and thus accepts the content at that feed rate. Some alternative embodiments stage the data, such as through additional buffers and operate at lower rates. This staging, however, can be impractical for some content given the size of typical data. Other embodiments attempt to encode at real time rates. The system 2220 can be assembled, in some embodiments, through off the shelf components using standard networks and/or busses, thus attempting to avoid obsolescence and/or leverage faster processors and components as they become available.

Figure 23:
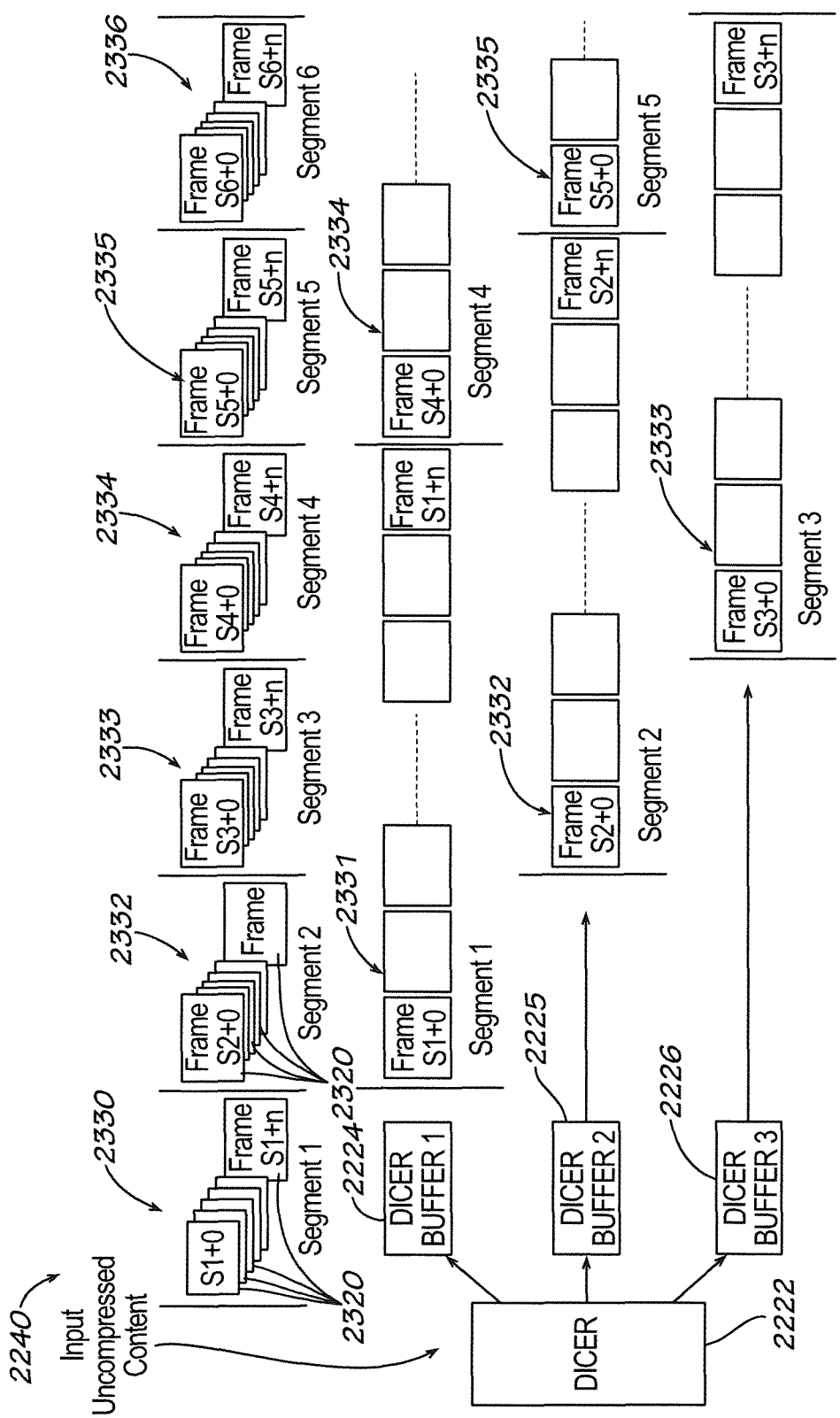
FIG. 23 depicts a simplified block diagram representation of a stream of content that is divided into divided segments.

FIG. 23 depicts a simplified block diagram representation of a stream of content 2240 that is divided by the dicer 2222 into divided segments 2242. The content 2240, when comprising video content, is typically received as a string of pictures or frames 2320, where each frame typically comprises data defining a plurality of pixels. The unencoded content is supplied to the dicer 2222.

Figure 24:
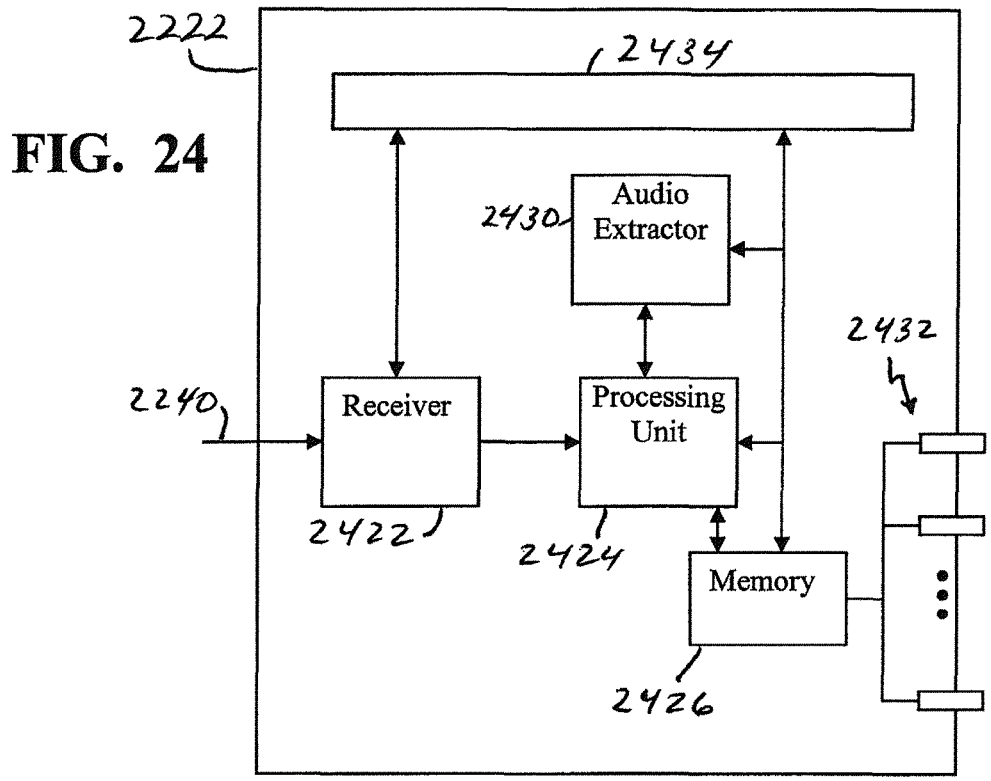
FIG. 24 depicts a simplified block diagram of an example implementation of a dicer according to some embodiments.

FIG. 24 depicts a simplified block diagram of an example implementation of a dicer 2222 according to some embodiments, where the dicer 2222 is implemented at least in part through a hardware architecture. The dicer includes a content stream receiver 2422, dicing processor unit 2424, memory 2426, audio extractor 2430, output ports 2432, and controller 2434. The content stream receiver 2422 can be implemented in some embodiments at least in part through a serial digital interface (SDI) receiver (e.g., SMPTE292M) that receives the streaming, unencoded content 2240. The dicing processor unit 2424 can include a field programmable gate array for dicing the content (e.g., video) and communicating with a host (e.g., over a PCI bus), a microprocessor and/or other processor or combination of processors. The memory typically includes one or more buffer memories, preferably deep or relatively large commodity memory(s) that absorb the segments, and are large enough to handle practical segment sizes according to expected encoding schemes, such as sizes of about 50 frames or more (e.g., approximately 250 MB or more for each encoding processor unit), however, other sizes can be employed depending on the expected data to be received and/or encoding scheme to be employed.

The ports 2432 can be substantially any port, and in some implementations include multiple firewire ports (e.g., 1394b-800 Mbps firewire ports) that deliver the divided segments to the encoder processor units 2230-2232 (see FIG. 22). In some embodiments, the content stream includes visual and audio content. As such the audio extractor 2430 extracts audio from the receiver and delivers it to the host and/or alternate processor for processing. The controller 2434 provides overall control of the dicer 2222 including machine control services.

Figure 25:
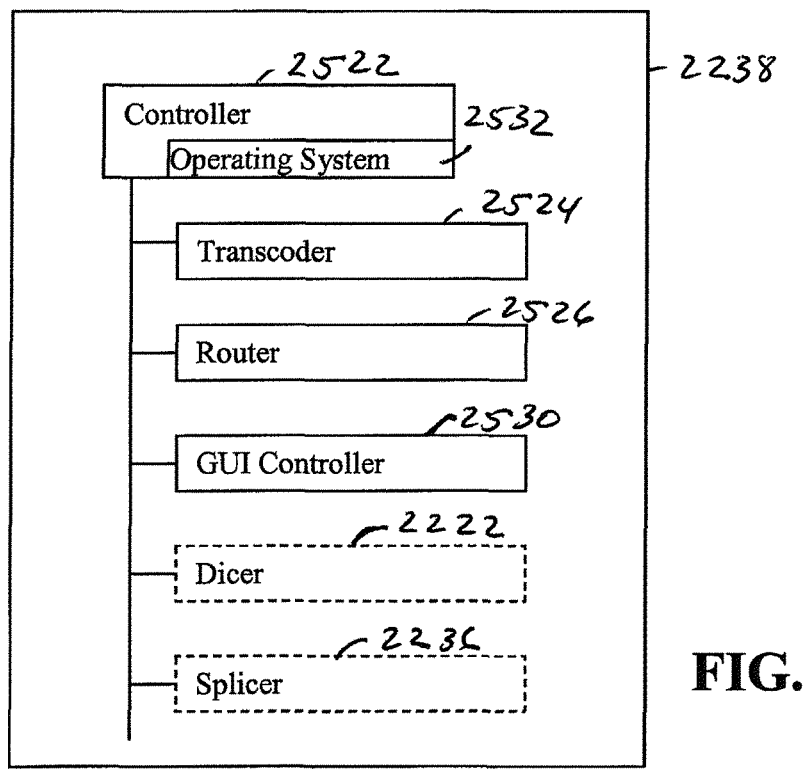
FIG. 25 depicts a simplified block diagram of an example a host system that can be implemented in the encoding system of FIG. 22.

FIG. 25 depicts a simplified block diagram of an example a host system 2238 of the encoding system 2220 of FIG. 22. The host system 2238 can include a central controller 2522, a transcoder 2524, content router 2526, and graphical user interface (GUI) controller 2530. In some embodiments, the dicer 2222 and/or the splicer 2236 are part of the host 2238. The central controller 2522 manages the encoding system 2220 coordinating at least the dicing and splicing. In some embodiments the central controller 2522 is implemented through one or more microprocessors and/or computers that employs an operating system 2532 and accesses and runs software, such as a library of software for controlling the acquisition of content from sources such as cameras, video tape recorder (VTR) decks and other sources. The operating system can be, for example, Microsoft Windows XP, Linux or other operating systems that provide an overall layer of control and cooperates the host with other systems and/or programs, such as other content source and/or editing systems (e.g., Microsoft's DirectShow™, QuickTime™ and other such systems). The controller 2522 can further monitor encoding and/or include additional monitors that monitor the compliance of the buffer levels of the encoder processor units 2230. The router 2526 in part controls delivery of the content stream 2240 to the dicer 2222. In some implementations, the router delivers the content as file based content. The GUI 2530 provides an interface through which a user can manipulate, control and alter the system operations, provide parameters, thresholds and/or other information, and/or obtain reports, statistics, results and/or view encoded content (including entire stream and/or re-encoded segments).

Referring back to FIGS. 22 and 23, in operation the encoding system 2220 receives the content, divides the content into divided segments through the dicer 2222, encodes the divided segments, and splices the encoded divided segments back together as an encoded output stream 2246. The dicer 2222 receives the uncompressed input 2240 that is to be divided into a series of divided segments 2331-2336, with each segment containing a plurality of frames 2320. The divided segments are typically defined by grouping a set of frames in succession. The dicer separates the divided segments and delivers the segments to different buffers 2224-2226. For example, a first divided segment 2331 is delivered to a first encoder buffer 2224, where the segment comprises a plurality of frames S1+0 through S1+n. A second divided segment 2332 is delivered to the second buffer 2225, and the third divided segment 2333 is delivered to the third buffer 2226. If the system only includes three encoders, a fourth segment 2334 is typically delivered to the first buffer 2224, the fifth segment 2335 to the second buffer 2225 and so on. It is noted, however, that in some implementations the segments are not equal in length and/or content and thus upon recycling to the first buffer 2224, the first buffer may still contain content beyond a threshold due to one or more prior segments being sufficiently large, and the dicer skips the first buffer and evaluates subsequent buffers for delivering the divided segments. Further, the system can include substantially any number of encoding processing units.

The divided segments 2331-2336 can include substantially any number of pictures or frames, and each divided segment does not necessarily include the same number of frames. Some embodiments utilize I-frames as divided segment boundaries, thus these divided segments start with an I-frame.

One of the benefits provided by the encoding system 2220 is that the encoding processor units 2230-2232 are connected to a buffer 2224-2226 and draw content data from the buffer at a rate that is less than the rate at which the data 2240 is being received (e.g., real time rate). Therefore, the encoding processor units 2230-2232 can operate at rates that are less than received data rates. For example, if the data is coming in at a real time full rate, and there are three encoder processor units 2230-2232, each encoding processor unit can effectively operate at about one third the rate of the received content, with the sum of the three encoding processor units providing effectively an encoding rate about equal to the received rate. By paralleling the encoding processing, the encoding system 2220 increases the operating bandwidth. In some embodiments, the encoding processor units 2230-2232 are operated at rates so that the summation of the parallel encoding exceeds the rate of the received input signal 2240 to in part compensate for delays introduced by the processing. For example with three encoding processor units, each encoding processor unit can be implemented to operate at about 35-40% the data rates of the input content 2240, effectively provide 105-120% encoding rates, where the addition +5-20% compensates for the overhead processing time associated with dicing, buffering, splicing and/or other potential processing overhead.

Figures 26, 27:
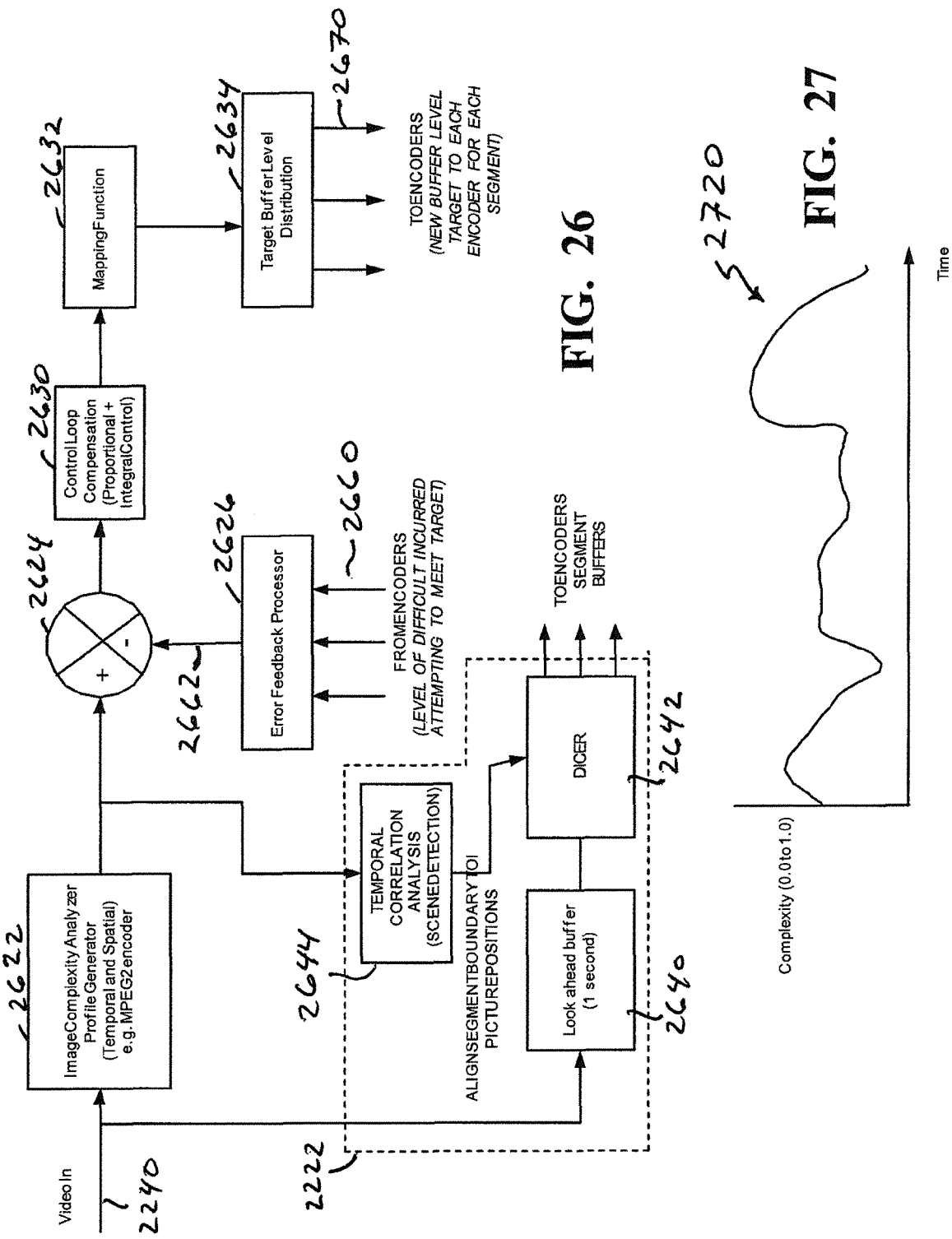
FIG. 26 depicts a block diagram of a portion of the encoding system of FIG. 22 according to some embodiments.
FIG. 27 depicts a simplified graphical representation of a complexity profile or mapping of a content stream scaled to unity that might be generated through the complexity analyzer of FIG. 26.

FIG. 26 depicts a block diagram of a portion of the encoding system 2220 further detailing at least the dicer 2222, encoding control, and feedback according to some embodiments. The system includes an image complexity analyzer 2622, a control loop 2624, an optional error feedback processor 2626, a control loop compensator 2630, mapping function 2632, target buffer level distributor 2634, delay buffer 2640, dicer distributor 2642, and an optional temporal correlation analyzer 2644.

The image complexity analyzer 2622 performs an analysis of the complexity of the content stream 2240, such as video data. Based on the complexity determination, the complexity analyzer generates complexity parameters and/or guides that relate to buffer levels that may be used at given points relative to the content stream. Generally, the more complex the data, the more buffer levels the system tends to be using such that typically the more complex the content stream the more buffer space needed. This relationship between complexity to buffer level needs is typically not a linear relationship.

FIG. 27 depicts a simplified graphical representation of a complexity profile or mapping 2720 of a content stream scaled to unity that might be generated through the complexity analyzer 2622. Referring to FIGS. 26 and 27, the complexity analyzer 2622 generates complexity parameters or scales that are utilized to adjust encoding levels of the encoding processor units 2230-2232 in attempts to satisfy desired decoder buffer level models. Generally, as the complexity increases the encoding rates are increased.

In some embodiments, the complexity analyzer 2622 is implemented at least in part through an MPEG2 encoder and/or other simplified encoder to predict the complexity. For example, the complexity analyzer can at least in part be implemented through an off the self MPEG2 encoder that is set to operate in a fixed quant or quality mode. The fixed quality mode operates and encodes generally without regard to a buffer level and data bit rates. Instead the encoder performs a free-form encoding. The encoded content of the picture or frame processed through the fixed quant encoder results in an encoded picture having an arbitrary data size. The data size can be used in some embodiments as a reflection of the complexity of encoding of that frame. Still other embodiments may employ an AVC, VC1 or other encoder as part of the complexity analyzer when processing capabilities are available. Other complexity analyses can also be employed such as intra frame analysis comparing standard deviations from a mean pixel value with dynamic range used, inter frame analysis comparing intra measures from picture to picture, comparison of histograms from picture to picture, motion analysis measuring the correlation in motion vectors, and/or other analyses.

The system then defines a complexity parameter (which in some embodiments is the data size of the encoded frame) and stores the complexity parameter. Based on a series of complexity parameters of the content stream 2224, a complexity mapping 2720 of the data set (e.g., content stream) is defined, and in some implementations has a granularity of a picture or granularity of a GOP. In some instances, the complexity mapping is summed to get an entire mapping for a divided segment that is being processed through the system.

Some implementations of the encoding system include the optional error feedback processor 2626 that receives error feedback 2660 based on the resulting encoded content. The error feedback processor processes the errors into error parameters 2662. In some instances, the feedback is received from the encoding processor units that return information relative to the difficulty the encoding processor units had in meeting defined encoding target levels indicating an accuracy of the complexity analyzer and/or mapping function.

These difficulty parameters can then be utilized by the control loop 2630 to adjust the mapping function as described fully below. The control loop provides buffer level predictions to the encoding processor units that is adapted through the feedback based on error responses from the encoding processor units. Additionally and/or alternatively, the control loop 2630 can adjust the mapping function based on the determined complexity of a current frame or divided segment and how that complexity data relates to previous complexity data for previous frames or divided segments (e.g., by evaluating quantization levels).

The control loop 2630 compares the complexity profile and/or the feedback parameters in attempts to determine whether the encoder processor units are encoding at desired rates. Differences or deltas between what the system specifies as encoding rates and the rates at which the encoder processor units are performing can affect the system operation and are perpetuated at least to the buffer levels. For example, when the encoder processor units perform at rates less than specified, data is not pulled from the buffers at rates equal to the rates at which data is supplied and the buffer levels increase more than expected which can affect the levels of encoding of subsequent frames. Similarly, if the encoder processor units operate at rates above expectation, the buffer level will be lower.

Based on the control loop comparison, the control loop compensator 2630 defines compensation parameters. The compensation parameters are used in the mapping function 2632 to modify a mapping to improve the complexity prediction as the data is processed. This allows for the adjustment of the mapping function during processing and/or in real time, as the mapping function is effectively an approximation that is content dependent. Alternative embodiments employ a two pass process by initiating a complexity analysis of the entire stream. Following the analysis, the complexity is then utilized to control the encoding processor units. Those systems employing the two pass process typically do not include the look ahead buffer 2640 as the complexity parameters are already known based upon the pass to adjust encoding processor units.

The mapping function 2632, in some embodiments, employs a second or third order polynomial as the mapping function. The mapping is supplied to the target buffer level distributor 2634 that generates buffer level target rates 2670 that are supplied to the encoding processor units 2230-2232 to adjust and/or maintain the encoding rates in attempts to satisfy desired or expected buffer levels. A table or spreadsheet can be utilized in some embodiments to implement the adjustments in the mapping function. For example, one or more look up tables can be utilized that contain desired encoding buffer levels for different levels of data rates. Additionally and/or alternatively, the tables can define sets of polynomials that can be employed depending on the identified complexity, data rates and/or error feedback as analyzed by the control loop compensator 2630.

The adjustments to the mapping function can be implemented continuously to allow continuous adjustments to encoding rates. In other implementations, the adjustments to encoding rates and/or desired buffer levels are implemented at divided segment boundaries (where boundaries are typically the last frame of one divided segment and/or the beginning of a subsequent divided segment). This adjustment of encoding rates attempts to achieve a desired target buffer level for the add point for a particular segment that covers the start point for following divided segments. The encoding processor units utilize the buffer level target rates 2670 in attempts to meet that goal, while the system continues to receive the feedback 2660 with respect to the difficulty in meeting the goals.

As described above, the dicer 2222 divides the content stream 2240 into a plurality of divided segments 2331-2336. The determination of the boundaries between the divided segments can be based on predefined periodic number of frames, predefined amounts of time, the complexity of the content 2240, and other parameters or combinations of parameters. For example, in some simplified implementations of the present embodiments, the divided segment boundaries can be set blindly based on a period of time (e.g., every one second of time) without regard to the content. The encoding processor units then encode divided segments to align with that one second of time boundary allowing the resulting encoded divided segments to be pieced together at the end. Selecting the divided segment boundaries without regard to the content (e.g., periodically based on time or number of frames) can often result in less than optimal coding quality.

Some embodiments alternatively utilize the complexity analysis 2720 to identify positions within the content stream 2240 where boundaries can be implemented between divided segments 2331-2336 that provide more accurate encoding and/or distribute the encoding processing more evenly over the plurality of encoding processor units. In utilizing the complexity analysis the system attempts to align the dividing segment boundaries to an appropriate point within the content. For example with video content, a boundary point can be selected at a point within the content that include high action and/or has less correlation (less referencing between frames) over time (e.g., scene change or a fast shot). In many instances it is desirable to position I-frames at portions of the content that have high action or has less correlation, and this allows many of the divided segments 2331-2336 to have an I-frame at the beginning of each grouped segment.

Still referring to FIGS. 26 and 27, the system can employ the delay or look ahead buffer 2640, at least in part, to allow time to identify potential divided segment boundaries. This delay buffer can provide a delay, for example of 1 second, however, substantially any delay can be utilized depending on the system and available system resources. This allows the image complexity data 2720 to be received by the dicer distributor 2642 prior to receiving the content stream to be diced and encoded. By looking ahead on the complexity data, the dicer distributor 2642 has time to evaluate the complexity and identify positions where divided segment boundaries can be defined that correlate with high action, less correlation and/or other locations along the stream where boundaries can be selected.

Some embodiments further include a temporal correlation analyzer 2644 that aids in identifying divided segment boundaries. The temporal correlation analyzer 2644 can detect large spikes in data rates from one picture to the next that can indicate scene changes and/or high action, thus the complexity typically increases. Additionally and/or alternatively, some embodiments utilize the MPEG2 encoder of the image complexity analyzer 2622 to identify transitions in GOP structures outputted from the MPEG2 encoder that indicate positions along the content stream where the MPEG2 encoder detected scene changes. Typically, MPEG2 encoders include relatively good scene detection, and such scene detection can be used to identify divide segment boundaries.

Further, the temporal correlation analyzer 2644, in some implementations, further identifies frame boundaries that also maintain telecine boundaries. The temporal correlation analyzer can include a telecine detection algorithm that identifies a change in frame rates, for example changes from content originally recorded for video (e.g., television content containing about 30 frames per second for U.S. television) verses content originally recorded for motion picture film (e.g., content containing 24 frames per second). As is known in the art, the conversion of motion picture film content to television content employs the repeating of fields. As such, some implementations of the temporal correlation analyzer attempt to define divided segment boundaries while maintaining the telecine boundaries (e.g., avoiding dividing fields) . In some instances, the temporal correlation analyzer utilizes a separate MPEG encoder, or utilizes the MPEG encoder of the image complexity analyzer as some MPEG encoders detect telecine boundaries.

Referring to FIGS. 22, 23 and 26, based on the determined divided segment boundaries the dicer 2642 divides up on the content into the divided segments 2331-2336. These divided segments are then forwarded to the encoder processing units 2230-2232 for encoding. Once the grouped segments are encoded, the encoded content is forwarded to the splicer 2236 that combines the encoded divided segments into a single stream 2246.

The encoding processor units 2230-2232 can be operated, in some embodiments, on one of a plurality of different operational modes. For example, one mode of operation sets the encoding processor units to meet defined encoding schemes regardless of the resulting quality. An alternative mode of operation defines a limit or threshold quality level below which the encoding processor unit ignores the encoding scheme parameters and maintains a signal quality level and thus may fail to satisfy one or more decoder buffer models. The system then employs the segment based re-encode to go back and address those areas of the encoded content that fail to meet signal quality levels and/or fail to meet decoder models where the re-encoding can include adjusting the encoding rate to improve quality, transrating in attempts to meet buffer level parameters and/or other encoding techniques or combinations of techniques.

Some embodiments provide in part for segment based re-encoding that improves the resulting encoded content, allows the encoded content to meet one or more desired encoding standards without having to perform a complete re-encode of the entire content, and producing overall better quality as the encoding rates can be varied over the content stream. Additionally, some embodiments provide for the ability to incorporate custom GOP placement within the content after a base encode has already been completed without having to resort to fully re-encoding the entire stream. Further, the custom GOP placement can be implemented by re-encoding a small portion of the encoded content.

Allowing for the custom GOP placement provides a user with greater flexibility and control over the resulting encoded product, and can significantly reduce processing time and overhead. For example, a user may initiate a base encode and following that encode realize that it would be beneficial to include an additional chapter point, or a user may have forgotten to include chapter points. Some present embodiments allow for the insertion of chapter points and other content organization after the base encode without the hassle and time expense in re-encoding the entire content stream. Further, the present embodiments allow for the insertion of chapter points or other content organization, and/or provides for custom GOP placement through segment based re-encodes, while still maintaining the level of the encoded content such that the encoded content satisfies desired decoder buffer models.

In encoding content, such as in digital video disc (DVD) creation, users often want to define and/or position GOPs in specific places so they can put, for example, a chapter point at that point or location. In some prior systems, the user had to specify the locations of chapter points prior to a base encode so that the encoder could incorporate the GOPs at the specified locations. Failing to define the desired GOP structures and/or chapter points in prior systems before the base encode typically required the user to go back, define the GOPs and/or chapter points and implement a completely new full encode of the entire content steam.

Some present embodiments, however, allow a user to employ the segment based re-encode to define GOP structures, chapter points, other organization input, and/or otherwise alter the encoded content while still satisfying decoder standards after an initial base encode and/or subsequent encodes. Thus, some embodiments provide mechanisms for going back after a base encode and/or subsequent encodes to incorporate new GOPs without having to re-encode the entire data set. Following an encode or with content previously encoded, a user can identify positions along the encoded stream where chapter points, GOP structures and/or other content organization is to be positioned and the system can implement the segment based re-encode to insert the desired GOP, chapter point and/or other organization. Therefore, some embodiments allow for the creation of GOPs, the insertion of chapter points and/or other organization, after the encoding has taken place. In some instances, the altering of the GOP structure and/or the insertion of a chapter point includes the conversion or promotion of a B- or P-frame to an I-frame, effectively truncating or extending the GOP structure and creating a new GOP starting from about a desired location.

Figure 28:
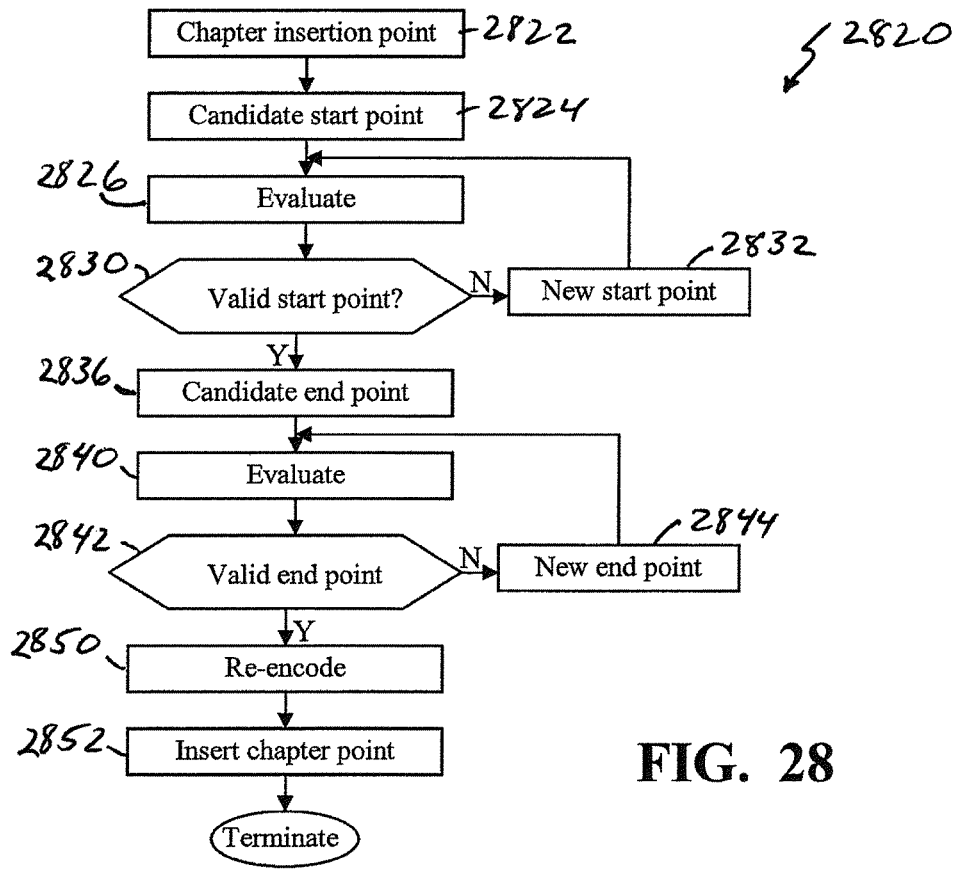
FIG. 28 depicts a simplified flow diagram of a process according to some embodiments for the insertion of a chapter point and/or the altering of group of picture (GOP) structures.

FIG. 28 depicts a simplified flow diagram of a process 2820 according to some embodiments for the insertion of a chapter point and/or the altering of GOP structures. In step 2822 the location of chapter insertion or the point where the GOP structure is to be altered is identified. In some instances, the chapter insertion point is defined by a user. In step 2824, the process identifies a candidate re-encode start point picture or frame that is distanced from the defined insertion point. Typically, to incorporate the desired chapter point and redefine the GOP structure, the re-encode start point picture is selected a distance from the desired location so that the segment re-encode can adjust the referencing between pictures so that the chapter insertion point is not hindered by picture references. Often the system defines a new GOP structure at the insertion point and thus redefines the picture types such that an I-picture exists at the desired insertion point.

In step 2826 the candidate start point picture is evaluated. Typically, this evaluation is similar to the evaluation preformed in process 820 of FIG. 8. In step 2830 it is determined whether the candidate start point picture is a valid start point picture. When the candidate start point is valid, the process continues to step 2836. Alternatively when the candidate start point is not valid, step 2832 is entered where an alternate candidate start point is identified and the process returns to step 2826 for evaluation.

When a valid start point picture is identified, the process proceeds to step 2836 where a candidate end point picture is identified. Again typically, the candidate end point is selected a distance from the defined insertion point such that the identified start point picture and the candidate end point picture straddle the defined insertion point. In step 2840 the candidate end point picture is evaluated. This evaluation, in some embodiments is similar to the evaluation performed in the process 820 of FIG. 8. In step 2842 it is determined whether the candidate end point picture is a valid end point picture. When the candidate end point is not valid, step 2844 is entered where an alternate candidate end point is identified and the process returns to step 2840. Alternatively, when the endpoint is valid, step 2850 is entered where the segment re-encode is initiated to re-encode the segment defined between the identified start and end points. In step 2852 the desired GOP restructuring and/or chapter point is inserted during the segment re-encode at about the desired location, for example by altering the picture type at about the defined insertion point. In some embodiments, the process 2820 can identify a plurality of potential start and end points and allow the user to select which of the plurality of start and end points are to be used. The process repeats for each chapter point insertion and/or GOP adjustment.

Further, some embodiments allow for content to be encoded in order to meet defined bit budget parameters, such as limiting content to be stored onto a portable storage medium, while still meeting desired decoder buffer models. In meeting a bit budget, some embodiments can start an initial or base encode, where the encoding can be based on substantially any relevant encoding scheme and can include fixed or variable bit rate encoding, in attempts to satisfy one or more decoder buffer models. Following the initial encode, subsequent segment re-encodes may be initiated as described above to address errors and/or failures to meet one or more desired decoder models. Additionally and/or alternatively, the total bit count can be determined for the encoded content. The total bit count can be compared with a desired or maximum bit count or budget. If the total bit count exceeds the bit budget the encoded content can be evaluated to identify one or more areas or segments where the content can be re-encoded at lower levels to reduce the bits utilized for the one or more segments such that the total bit count meets the desired bit budget while still maintaining the quality of the encoded content to meet desired decoder buffer models.

In some embodiments, the initial encoding can be implemented such that the bit count of the initially encoded content is limited to about a first fixed amount. For example, a video stream to be encoded and stored on a portable optical storage medium with limited storage capacity, such as 5 Gbytes, can be encoded through an initial encoding such that the encoded content has a total bit count that is less than the maximum (e.g., 5 Gbytes) by a predefined amount (e.g., 10 to 20%) to provide a margin of error and head room.

Following the initial encoding and through the use of segment re-encoding, some embodiments can then increase the bit rates of one or more specific segments, thus improving quality, and using some or all of the available overhead (e.g., the addition 1 Gbyte). Further, some embodiments additionally allow for segment based re-encoding of some segments to decrease bit rates of some segments to allow for the increasing of rates in other segments. Still further, if more than the overhead storage area is needed to achieve encoded content that meet the desired decoder buffer models and/or standards, the present embodiments can evaluate the content to identify areas that have some headroom with respect to buffer models or standards and implement re-encodes of those areas to reduce the overall total bit count and/or to free up bits from those areas that exceed the acceptable bit rates, and using the freed up capacity to re-encode sections that fail to satisfy one or more buffer models. Therefore, this system improves the overall quality of the video compared to previous methods.

Some embodiments additionally allow for a variable bit rate over the length of the content stream. Many prior encoding systems use constant bit rates. For these constant bit rate encoders to encode content that did not exceed defined bit count limits, the systems calculated an amount of time or memory space available, determine a bit rate that would be within the bit count limit, and encode the entire content stream with that constant bit rate. The constant bit rate encoding often results in some portions of the content having much different quality than other portions.

Additionally, some embodiments can utilize the segment based re-encoding in attempts to moderate encoded content such that the signal quality resulting from the decode has less variation. In many instances, a viewer of video content more readily notices areas of lower quality when the content has relatively significant or large changes in quality than content that has a slightly lower overall quality yet has smaller or less quality variations. Some embodiments can apply a variable bit rate by reducing the quality of sections of the encoded content that are relatively high in quality (e.g., by comparing PSNR values) and apply the freed up capacity to the sections of encoded content that are lower in quality in attempts to try and even out the quality levels along the content stream and/or limit large changes in signal quality within predefined amounts of the content, while achieving an overall increase in quality.

Some embodiments also provide for the reallocation of bits over a stream of content through transcoding. The encoded content can be evaluated based for example on signal quality (e.g., PSNR) to identify portions of the stream where transcoding provides for the freeing up of bits without adversely or minimally affecting the quality. The portions of the stream to be transcoded can also be identified through other methods such as identifying portions where the motion vectors are diverse, areas with coarse quantization, macroblock effects, areas with redundancy, and other similar methods.

Additionally and/or alternatively, some embodiments in some implementations free up bits by converting I-frames to P-frames or B-frames. This conversion may be limited for certain applications, protocols and/or standards, for example, because of defined I-frame to B- and/or P-frame ratios. Still further reductions in bit count can be achieved in some embodiments through pre-filtering of the content. In some implementations, the content is filtered using one or more filtering techniques, such as but not limited to, median filtering, spatial filtering, temporal filtering, noise filtering, and/or other relevant filtering or combinations of filtering. The filtering can additionally and/or alternatively be applied during segment based re-encoding allowing a user to avoid applying a filter to an entire stream and instead applying the filtering to the selected segment or segments (e.g., portions of the content having fast action or rapid scene changes). Additionally, the filtering can be implemented during a re-encode at higher or harder levels to induce additional filtering of at least some segments to reduce bit count. In some instances, the filtering and/or the level of filtering applied is adjustable and/or selectable by a user to achieve desired results.

In identifying segments on which to apply filtering and/or re-encoding, the quality of the content can be evaluated, for example, based on motion vector(s), quantifiers and/or combinations thereof. Well organized or ordered vectors tend to indicate good encoding while random and/or poorly ordered motion vectors tend to indicate inaccurate encoding. Typically, however, some embodiments do not rely on the motion vectors exclusively as some content, such as video content that includes rain, weather, clouds, zooming in, and the like, can be difficult to encode and may not be detected as effectively using motion vectors and/or quantifier values.

Figure 29:
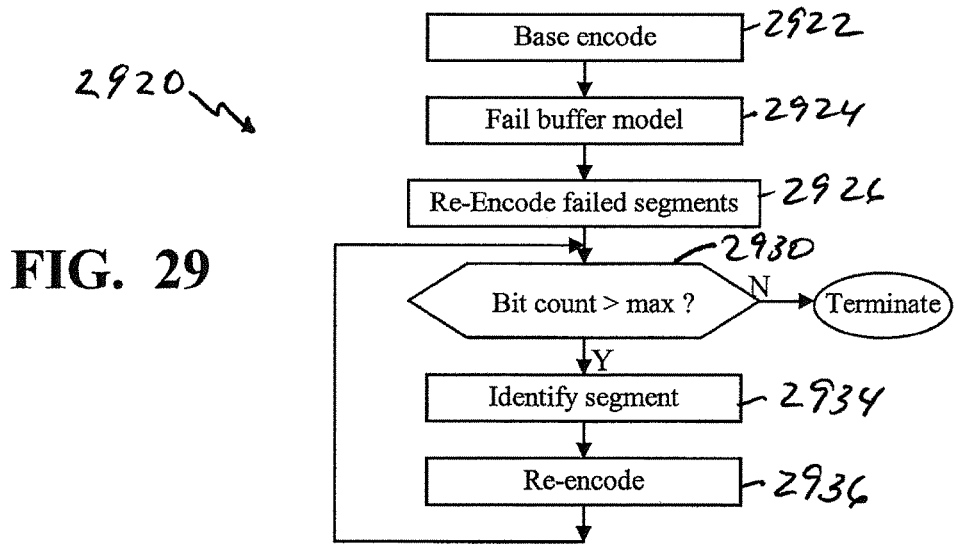
FIG. 29 depicts a simplified flow diagram of a process for use in adjusting the total bit count to meet or be below a desired bit budget.

FIG. 29 depicts a simplified flow diagram of a process 2920 for use in adjusting the total bit count to meet or be below a desired bit budget. In step 2922, a content stream is encoded through an initial or base encode such that the resulting encoded stream satisfy a predefined bit budget (e.g., 4 Gbits). In step 2924, the encoded stream is evaluated to determine whether a segment of the encoded stream fails one or more decoder models. As indicated above, the evaluation of the encoded stream can be initiated on the stream while being encoded and prior to a full encode.

In step 2926, the bit rates for the segments identified as in violation of one or more buffer models are decreased and are re-encoded such that they satisfy the desired buffer model(s). In step 2930, a total bit count is identified and the process 2920 determines whether the total count exceeds a defined maximum bit count. In those instances where the total bit count does not exceed the maximum bit count the process 2920 terminates.

When it is determined in step 2930 that the total bit exceeds a maximum, the process skips to step 2934 where a segment that has a quality that exceed buffer model thresholds by a largest margin is identified. In some instances the segments within a predefined distance or number of frames are reviewed and the segment with the largest margin within that distance or number of frames is selected. In step 2936, the identified segment with the maximum quality margin is re-encode at lower bit rate to free up additional bits. The process 2920 then returns to step 2930 to determine whether the total bit count is less than the desired maximum count. In some alternative configurations of the process 2920, the re-encode of the failed segment is not performed until a sufficient amount of capacity is freed up for the failed segment to be re-encoded.

Figure 30:
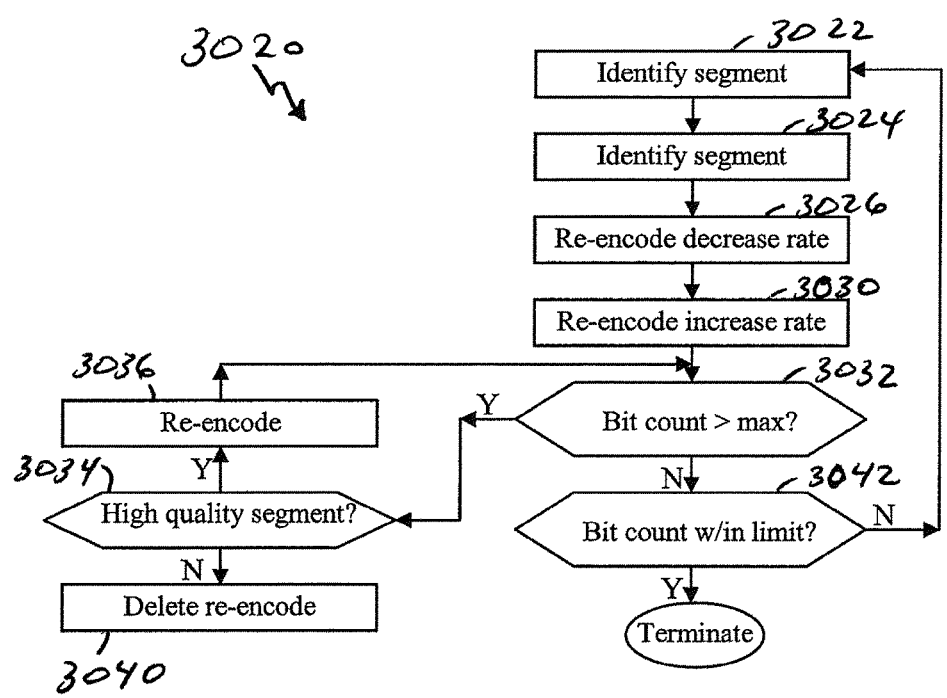
FIG. 30 depicts a simplified flow diagram of a process for use in smooth or limiting quality changes over a content stream.

FIG. 30 depicts a simplified flow diagram of a process 3020 for use in smooth or limiting quality changes over a content stream. In step 3022, one or more segments having a lowest quality level or a quality level that is below a first threshold limit are identified. In step 3024, the process determines whether one or more segments are identified that have high quality levels and/or have quality levels that exceed the quality levels of the one or more segments with the lowest quality by a second threshold and are within predefined ranges or numbers of frames of the one or more segments identified in step 3022. The predefined range can depend on many factors, such as buffer fill levels, buffer level shifting, predefined number of GOPs, rate of data transfer and/or other such factors. In step 3026 one or more of the identified segments with the high quality levels are re-encode at lower bit rate. In step 3030 the one or more segments identified with the low quality are re-encoded at increased rates.

In step 3032, the process determines whether a total bit count exceeds maximum total bit count. If the total bit count exceeds the maximum, step 3034 is entered where it is determined whether there is an additional segment having a high quality or a quality that exceeds the quality of another segment within predefined ranges or numbers of frames of the lower quality segment. When there is a segment with a high quality level the segment is re-encoded at lower a bit rate in step 3036, and the process returns to step 3032. If there is not a segment that has a relatively high quality level, step 3040 is entered where the re-encoded content with a quality that is below the first threshold is deleted and not utilized, and the process terminates.

When it is determined in step 3032 that the total bit count does not exceed a maximum, the process enters step 3042 where it determines whether the total bit count is within a limit of the maximum bit count. If the total count is not within the limit, the process returns to step 3022 to further identify additional segments to re-encode to even out and/or improve encoded quality, otherwise the process terminates.

The re-encoding and/or adjusting of the quality of content to redistribute bit budgeting can be implemented through some embodiments without user interaction. In some embodiments, however, prior to initiating a shift of bits to reduce the quality of high quality segments to allow for increasing the quality of low quality segments, some embodiments generate a time line for a user that identifies or marks those areas where it may be beneficial to adjust the quality. The system then allows the user to select adjustments if any and to implement the adjustments when desired. Additionally and/or alternatively, the system can be configured to generate the time line that identifies and labels the quality of segments and/or frames based on a predefined quality measure or scale (which in some instances can be selected by the user). Based on the labeled quality, the system can be configured to allow for a manual operation where the user can evaluate the stream of content and define areas of re-encode and/or quality adjustment.

As introduced above, some embodiments can be implemented through hardware, software, firmware and/or combinations thereof. Further, some embodiments can encode uncompressed high definition content, such as visual video content at accelerated rates (e.g., at about the rate the content is received) from a source, such as from sources over serial digital cables (e.g., SMPTE292M). The encoding can be performed in some implementations at real time rates, and can provide for transcoding of the high definition content in file form (e.g., AVI, Quicktime, Raw frames, and the like). Some systems are configured to be adaptable to changes in standards and new encoding formats, while allowing for adjustments and/or fixes in quality and feature enhancements. Some embodiments are implemented utilizing commodity components and are easily adaptable to take advantage of processor speed advancements and capabilities.

While the invention herein disclosed has been described by means of specific embodiments and applications thereof, numerous modifications and variations could be made thereto by those skilled in the art without departing from the scope of the invention set forth in the claims.

What is claimed is:

1. A method for use in encoding multimedia content, the method comprising:

initiating, by use of a processing unit and a memory, an encoding of a source content producing encoded content;

identifying a first segment of the encoded content to be re-encoded, the first segment including a portion but not all of a group of pictures (GOP);

identifying a first candidate start point and a first candidate end point for a re-encoding of the first segment;

determining, by use of the processing unit and the memory, whether the first candidate start point and the first candidate end point are valid points, the first candidate start point and the first candidate end point being valid if content within a region bounded by the first candidate start point and the first candidate end point is not referenced by content outside the region; and setting the first candidate start point and the first candidate end point as valid re-encode start and end points when the first candidate start point and the first candidate end point are validated.

2. The method of claim 1, wherein the determining whether the first candidate start point is valid comprises determining whether a first portion of the content prior to the first candidate start point is referenced by a second portion of the content following the first candidate start point relative to a playback timeline; and implementing the setting of the first candidate start point as the re-encode start point when the second portion of the content following the first candidate start point does not reference the first portion of the content prior to the first candidate start point.

3. The method of claim 1, further comprising:

determining whether the first candidate end point is a valid end point by evaluating a fourth portion of the encoded content relative to the first candidate end point; and setting the first candidate end point as a valid re-encode end point when the first candidate end point is validated.

4. The method of claim 1, wherein determining whether the first candidate end point is valid comprises determining whether at least a portion of content within a candidate segment between the valid re-encode start point and the first candidate end point is referenced by content outside the candidate segment; and implementing the setting of the first candidate end point as the valid re-encode end point when the at least the portion of the content within the candidate segment is not referenced by content outside the candidate segment.

5. The method of claim 1, wherein the determining whether the first candidate start point is valid comprises accessing an index for a frame prior to the first candidate start point relative to a playback timeline and determining whether the index contains a listing of a frame following the first candidate start point relative to the playback timeline; and implementing the setting of the first candidate start point as the re-encode start point when the index does not contains the listing of the frame following the first candidate start point.

6. The method of claim 1, further comprising:

upgrading the first candidate start point to an intraframe.

7. The method of claim 1, wherein:

the identifying the first segment to be re-encoded comprises evaluating the first segment of the encoded content relative to one or more buffer models;

determining whether the first segment of the encoded content is to be re-encoded relative to at least one of the one or more buffer models based on the evaluating.

8. The method of claim 1, further comprising:

identifying a second segment of the encoded content;

re-encoding the second segment freeing up bits; and the re-encoding of the first segment comprises re-encoding the first segment to utilize the freed up bits.

9. The method of claim 1, further, comprising:

generating a bit rate track graphically representing bit rates for portions of encoded content;

generating a quality track graphically representing a quality of encoding of the portions of encoded content that corresponds with the bit rate track; and identifying in the bit rate track a selection of a portion of the encoded content to be re-encoded.

10. The method of claim 9, further comprising:

generating an entry point track graphically representing entry points, where the entry point track corresponds with the bit rate track; and generating a picture structure track graphically representing picture structures of the encoded content, where the picture structure track corresponds with the bit rate track.

11. The method of claim 9, further comprising:

providing selectable re-encode start point and end point options; and providing zooming capabilities to zoom in and out on at least the bit rate track.

12. A method comprising:

identifying a first segment of encoded content to be re-encoded, the first segment including a portion but not all of a group of pictures (GOP);

generating, by use of a processing unit and a memory, a bit rate track graphically representing bit rates for portions of the encoded content;

generating, by use of the processing unit and the memory, a quality track graphically representing a quality of encoding of the portions of encoded content that corresponds with the bit rate track; and identifying in the bit rate track a selection of a portion of the encoded content to be re-encoded.

13. The method of claim 12, further comprising:

generating an entry point track graphically representing entry points, where the entry point track corresponds with the bit rate track; and generating a picture structure track graphically representing picture structures of the encoded content, where the picture structure track corresponds with the bit rate track.

14. The method of claim 12, further comprising:

providing selectable re-encode start point and end point options; and providing zooming capabilities to zoom in and out on at least the bit rate track.

15. The method of claim 12, further comprising:

generating a bit rate indication for a selected segment of content;

registering an input moving the bit rate indicator.

16. The method of claim 15, wherein the bit rate indicator is a bit rate bar that is selectable and moveable by a user.

17. The method of claim 15, further comprising:

a bit rate value corresponding with a positioning of the bit rate indication.

18. The method of claim 12, further comprising:

generating settings options comprising a quality threshold and a segment length parameter;

identifying segments within the encoded content that have quality levels that are below the quality threshold and meet the segment length parameter.

19. The method of claim 12, further comprising:

generating a list of selected segments and defining a status of each segment in the list.

* * * * *